US012707439B2

(12) United States Patent
Su et al.

(10) Patent No.: US 12,707,439 B2
(45) Date of Patent: Aug. 11, 2026

(54) METHOD AND WIRELESS DEVICE FOR PERFORMING UPLINK TRANSMISSION TIMING CONTROL

(71) Applicant: Telefonaktiebolaget LM Ericsson (publ), Stockholm (SE)

(72) Inventors: Ling Su, Beijing (CN); Zhipeng Lin, Nanjing Jiangsu (CN); Johan Axnäs, Solna (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 338 days.

(21) Appl. No.: 18/556,208

(22) PCT Filed: May 4, 2022

(86) PCT No.: PCT/SE2022/050434
§ 371 (c)(1),
(2) Date: Oct. 19, 2023

(87) PCT Pub. No.: WO2022/235191
PCT Pub. Date: Nov. 10, 2022

(65) Prior Publication Data

US 2024/0188055 A1 Jun. 6, 2024

(30) Foreign Application Priority Data

May 6, 2021 (WO) ................ PCT/CN2021/091914

(51) Int. Cl.
*H04L 47/70* (2022.01)
*H04L 5/00* (2006.01)
(Continued)

(52) U.S. Cl.
CPC ....... *H04W 72/0446* (2013.01); *H04L 5/0051* (2013.01); *H04L 5/0094* (2013.01);
(Continued)

(58) Field of Classification Search
CPC . H04W 52/14; H04W 72/21; H04W 36/0009; H04W 74/004; H04W 74/006;
(Continued)

(56) References Cited

U.S. PATENT DOCUMENTS

2014/0086161 A1* 3/2014 Cai .................. H04W 56/0045 370/329
2019/0373592 A1* 12/2019 Ji .......................... H04B 7/022
(Continued)

OTHER PUBLICATIONS

Z. Guo, D. Chen and Y. Yuan, "5G NR Uplink Coverage Enhancement Based on DMRS Bundling and Multi-slot Transmission," 2020 IEEE 20th International Conference on Communication Technology (ICCT), Nanning, China, 2020, pp. 482-486 (Year: 2020).*
(Continued)

*Primary Examiner* — Salvador E Rivas
(74) *Attorney, Agent, or Firm* — Murphy, Bilak & Homiller, PLLC

(57) ABSTRACT

A wireless device (12, 50) obtains a window of time for bundling of a set of uplink transmissions (20) on a carrier or bandwidth part. The wireless device determines whether or not to apply a timing advance adjustment (16) within the window of time. The timing advance adjustment comprises an adjustment to a transmission timing of an uplink transmission on the carrier or bandwidth part. The wireless device transmits the uplink transmission on the carrier or bandwidth part during the window of time using a transmission timing which is in accordance with the determining. The determining is based on whether the timing advance adjustment is indicated by a received timing advance command (18) or whether the timing advance adjustment is due to a detected error in downlink timing.

19 Claims, 16 Drawing Sheets

(51) Int. Cl.

| | |
|---|---|
| ***H04L 25/02*** | (2006.01) |
| ***H04W 36/00*** | (2009.01) |
| ***H04W 72/0446*** | (2023.01) |
| ***H04W 72/21*** | (2023.01) |
| ***H04W 74/00*** | (2009.01) |
| *H04L 27/26* | (2006.01) |
| *H04W 52/14* | (2009.01) |

(52) U.S. Cl.

CPC ........ *H04L 25/0204* (2013.01); *H04L 47/828* (2013.01); *H04W 36/0009* (2018.08); *H04W 72/21* (2023.01); *H04W 74/004* (2013.01); *H04W 74/006* (2013.01); *H04L 27/261* (2013.01); *H04L 27/2613* (2013.01); *H04W 52/14* (2013.01)

(58) Field of Classification Search

CPC ............... H04L 27/261; H04L 27/2613; H04L 29/0673; H04L 47/828; H04L 61/2069

See application file for complete search history.

(56) References Cited

U.S. PATENT DOCUMENTS

| | | | | |
|---|---|---|---|---|
| 2021/0153193 | A1* | 5/2021 | Lin | G04R 20/02 |
| 2022/0353694 | A1* | 11/2022 | Ly | H04L 1/189 |
| 2023/0180164 | A1* | 6/2023 | Kim | H04W 56/0035 370/324 |
| 2024/0214151 | A1* | 6/2024 | Liu | H04L 5/0051 |

OTHER PUBLICATIONS

A. Mahmood, M. I. Ashraf, M. Gidlund, J. Torsner and J. Sachs, “Time Synchronization in 5G Wireless Edge: Requirements and Solutions for Critical-MTC,” in IEEE Communications Magazine, vol. 57, No. 12, pp. 45-51, Dec. 2019 (Year: 2019).*

3GPP, “3GPP TS 38.211 V16.4.0”, 3rd Generation Partnership Project; Technical Specification Group Radio Access Network; NR; Physical channels and modulation (Release 16), Dec. 2020, 1-43.

3GPP, “3GPP TS 38.321 V16.4.0”, 3rd Generation Partnership Project; Technical Specification Group Radio Access Network; NR; Medium Access Control (MAC) protocol specification (Release 16), Mar. 2021, 1-157.

3GPP, “3GPP TS 38.133 V17.0.0”, 3rd Generation Partnership Project; Technical Specification Group Radio Access Network; NR; Requirements for support of radio resource management (Release 17), Dec. 2020, 1-1812.

3GPP, “3rd Generation Partnership Project; Technical Specification Group Radio Access Network; NR; Medium Access Control (MAC) protocol specification (Release 16)”, 3GPP TS 38.321 V16.3.0, Dec. 2020, 1-156.

3GPP, “3rd Generation Partnership Project; Technical Specification Group Radio Access Network; NR; Physical layer procedures for control (Release 16)”, 3GPP TS 38.213 V16.4.0, Dec. 2020, 1-181.

3GPP, “3rd Generation Partnership Project; Technical Specification Group Radio Access Network; NR; Physical layer procedures for control (Release 16)”, 3GPP TS 38.213 V16.5.0, Mar. 2021, 1-183.

3GPP, “3rd Generation Partnership Project; Technical Specification Group Radio Access Network; NR; Physical layer procedures for data (Release 16)”, 3GPP TS 38.214 V16.5.0, Mar. 2021, 1-171.

3GPP, “3rd Generation Partnership Project; Technical Specification Group Radio Access Network; NR; Radio Resource Control (RRC) protocol specification (Release 16)”, 3GPP TS 38.331 V16.3.1, Jan. 2021, 1-932.

China Telecom, “New WID on NR coverage enhancements”, 3GPP TSG RAN meeting #90e, RP-202928, Electronic Meeting, Dec. 7-11, 2020, 1-5.

Moderator (China Telecom), “[104b-e-NR-R17-CovEnh-02] Summary of email discussion on joint channel estimation for PUSCH”, 3GPP TSG RAN WG1 Meeting #104bis-e, R1-2104006, E-Meeting, Apr. 12-20, 2021, 1-110.

Nokia, et al., “On the scope of RAN1 LS on phase and power requirements for joint channel estimation/DM-RS bundling of PUSCH and PUCCH”, 3GPP TSG RAN WG1 #104-e, R1-2101715, e-Meeting, Jan. 25-Feb. 5, 2021, 1-3.

Figure 2:
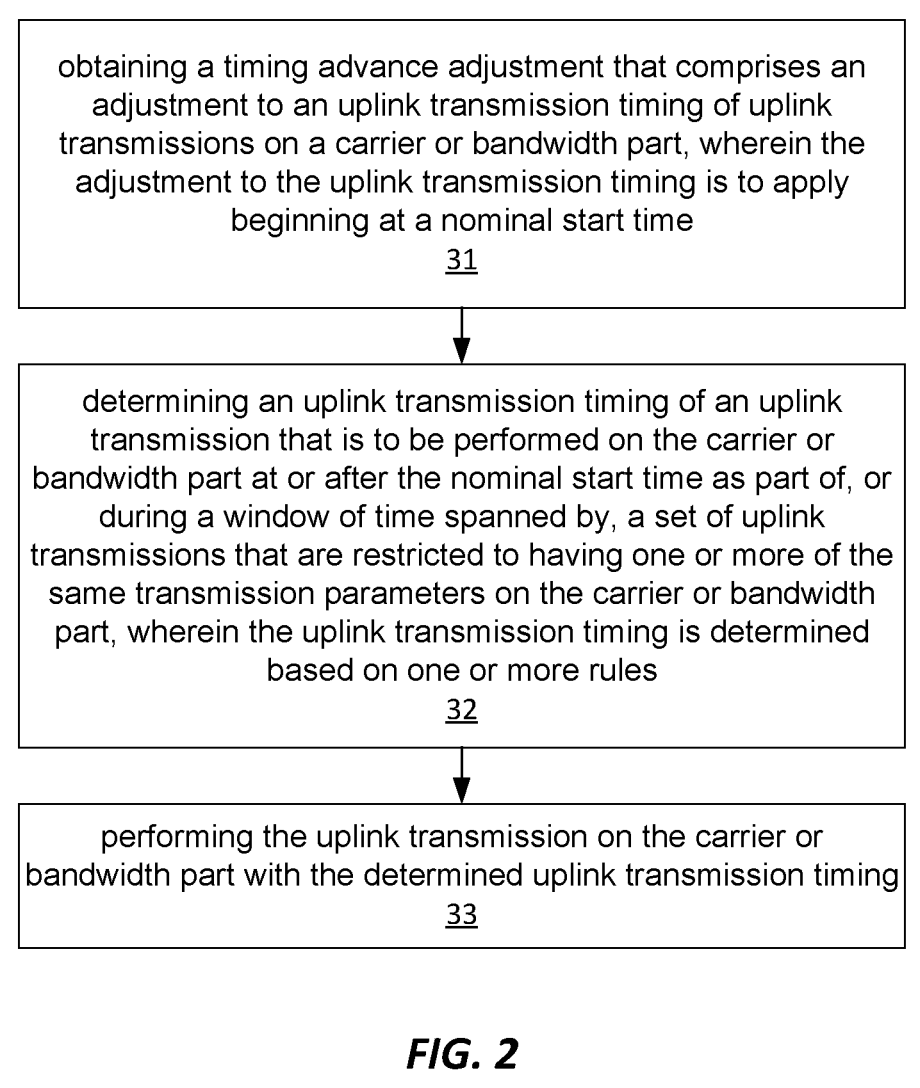

* cited by examiner obtaining a timing advance adjustment that comprises an adjustment to an uplink transmission timing of uplink transmissions on a carrier or bandwidth part, wherein the adjustment to the uplink transmission timing is to apply beginning at a nominal start time
31 determining an uplink transmission timing of an uplink transmission that is to be performed on the carrier or bandwidth part at or after the nominal start time as part of, or during a window of time spanned by, a set of uplink transmissions that are restricted to having one or more of the same transmission parameters on the carrier or bandwidth part, wherein the uplink transmission timing is determined based on one or more rules
32 performing the uplink transmission on the carrier or bandwidth part with the determined uplink transmission timing
33

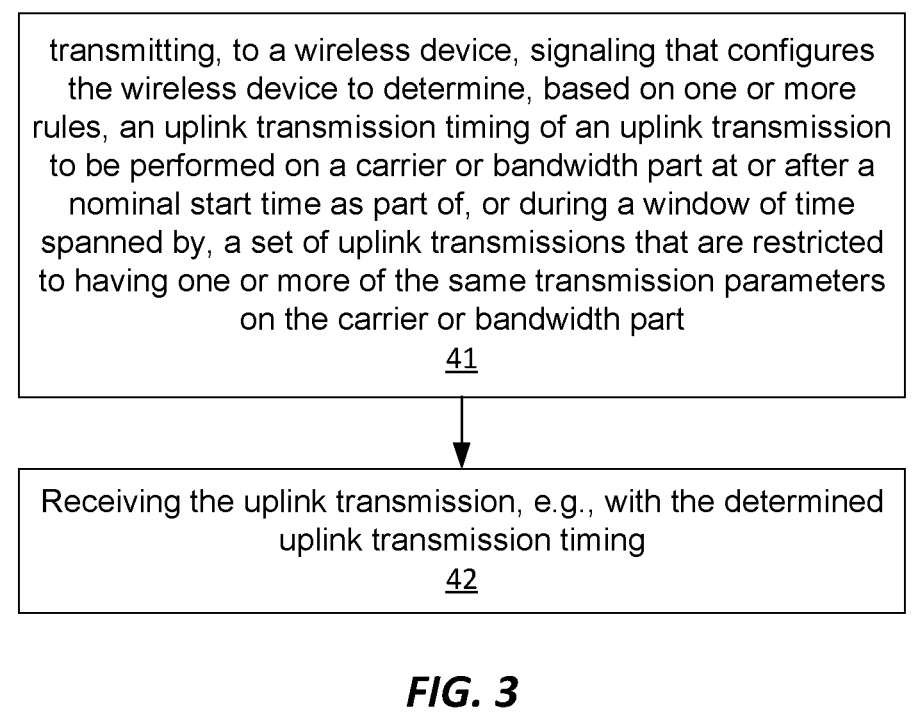

*FIG. 2* transmitting, to a wireless device, signaling that configures the wireless device to determine, based on one or more rules, an uplink transmission timing of an uplink transmission to be performed on a carrier or bandwidth part at or after a nominal start time as part of, or during a window of time spanned by, a set of uplink transmissions that are restricted to having one or more of the same transmission parameters on the carrier or bandwidth part
41

Receiving the uplink transmission, e.g., with the determined uplink transmission timing
42

*FIG. 3*

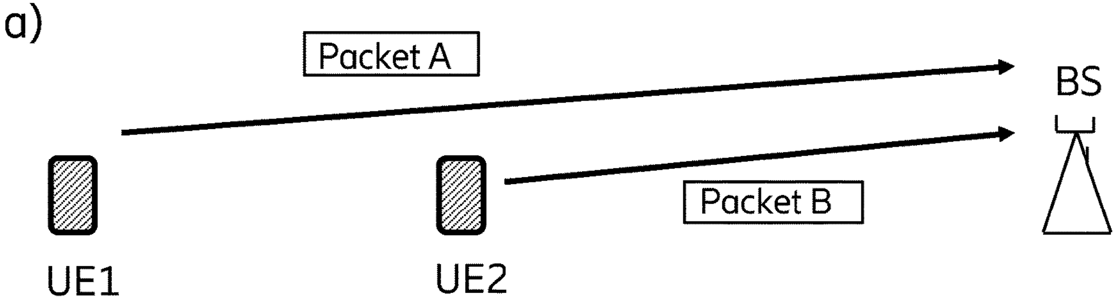
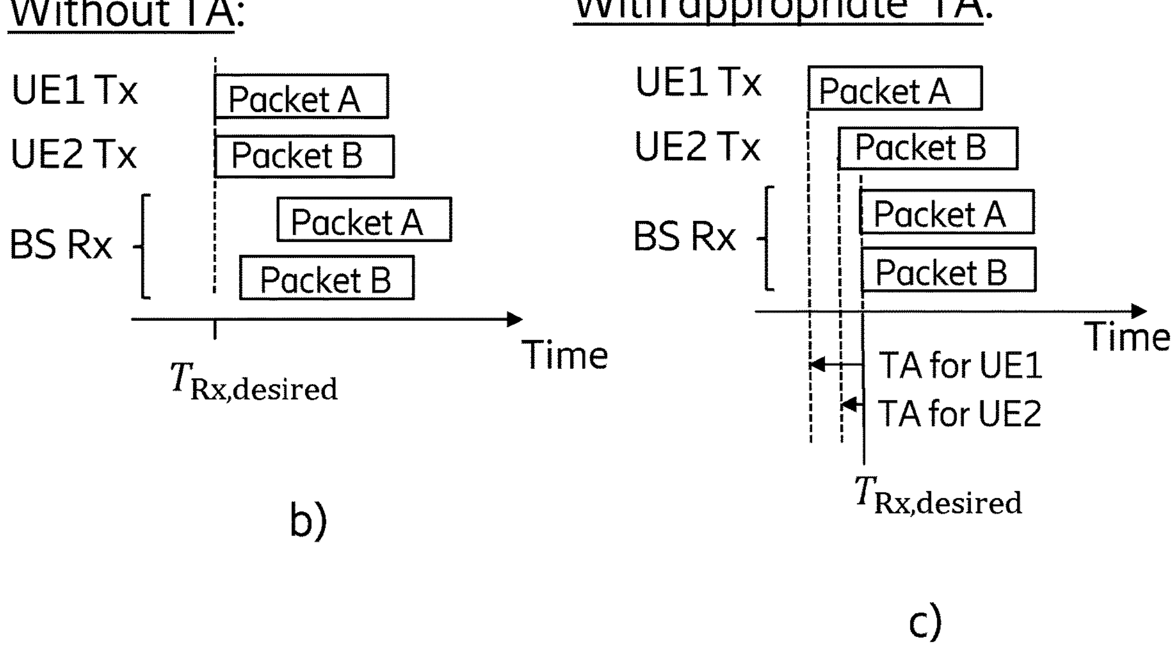
FIG. 6

METHOD AND WIRELESS DEVICE FOR PERFORMING UPLINK TRANSMISSION TIMING CONTROL

TECHNICAL FIELD

The present disclosure generally relates to control of uplink transmission timing in a wireless communication network.

BACKGROUND

Uplink transmissions from different wireless devices served by a base station in a wireless communication network should arrive at the base station time-aligned, e.g., within a defined misalignment tolerance. Time-alignment of the uplink transmissions, among other things, mitigates interference between the uplink transmissions, e.g., inter-subcarrier interference.

In order to ensure that uplink transmissions from wireless devices are received time-aligned, the base station controls the timing of the wireless devices' uplink transmissions. For example, the base station commands a wireless device that is far away from the base station to perform an uplink transmission relatively early in time, so that the uplink transmission will arrive time-aligned with the uplink transmission of a different wireless device that is closer to the base station. A command that controls the amount by which a wireless device is to advance the timing of its uplink transmissions is referred to as a timing advance command.

Challenges exist, though, in controlling the uplink transmission timing for time-aligned reception while also exploiting so-called joint channel estimation. In joint channel estimation, the base station jointly estimates the uplink channel based on measurement of multiple uplink reference signals, e.g., that are bundled together and/or that are received in a bundle of time slots. Such joint channel estimation over a set of multiple uplink transmissions can improve the channel estimation quality, and thereby improve overall link and system performance. Problematically, however, uplink transmission timing adjustment between bundled slots or reference signals jeopardizes the ability of the base station to perform joint channel estimation across those slots or reference signals.

SUMMARY

Some embodiments herein exploit one or more conditions under which uplink transmission timing can be adjusted, at least for some uplink transmissions, even between slots or reference signals that are bundled together for joint channel estimation. In doing so, some embodiments facilitate time-aligned reception of at least some uplink transmissions while at the same time preserving the ability of the base station to perform joint channel estimation despite uplink transmission timing adjustment. Advantageously, then, some embodiments mitigate interference attributable to uplink timing misalignment while also facilitating overall link and system performance improvements realizable from joint channel estimation.

A first aspect provides embodiments of a method performed by a wireless device. The method comprises obtaining a window of time for bundling of a set of uplink transmissions on a carrier or bandwidth part. The method comprises determining whether or not to apply a timing advance adjustment within the window of time. The timing advance adjustment comprises an adjustment to a transmission timing of an uplink transmission on the carrier or bandwidth part. The method comprises transmitting the uplink transmission on the carrier or bandwidth part during the window of time using a transmission timing which is in accordance with the determining. The determining is based on whether the timing advance adjustment is indicated by a received timing advance command or whether the timing advance adjustment is due to a detected error in downlink timing.

A second aspect provides embodiments of a wireless device configured to perform the method of the first aspect.

A third aspect provides embodiments of a method performed by a radio network node. The method comprises transmitting, to a wireless device, signaling that configures the wireless device to obtain a window of time for bundling of a set of uplink transmissions on a carrier or bandwidth part, determine whether or not to apply a timing advance adjustment within the window of time, wherein the timing advance adjustment comprises an adjustment to a transmission timing of an uplink transmission on the carrier or bandwidth part, and transmit the uplink transmission on the carrier or bandwidth part during the window of time using a transmission timing which is in accordance with the determining. The determining is based on whether the timing advance adjustment is indicated by a received timing advance command or whether the timing advance adjustment is due to a detected error in downlink timing.

A fourth aspect provides embodiments of a radio network node configured to perform the method of the third aspect.

BRIEF DESCRIPTION OF THE DRAWINGS

FIG. 2 is a logic flow diagram of a method performed by a wireless device according to some embodiments.

FIG. 3 is a logic flow diagram of a method performed by a radio network node according to some embodiments.

FIG. 6 schematically shows a) exemplary Tx and Rx times for UEs with different distance to the BS for the case of b) no timing advance or c) appropriate timing advance. "Packet A" and "Packet B" could e.g., represent one transmitted slot.

DETAILED DESCRIPTION

Figure 1:
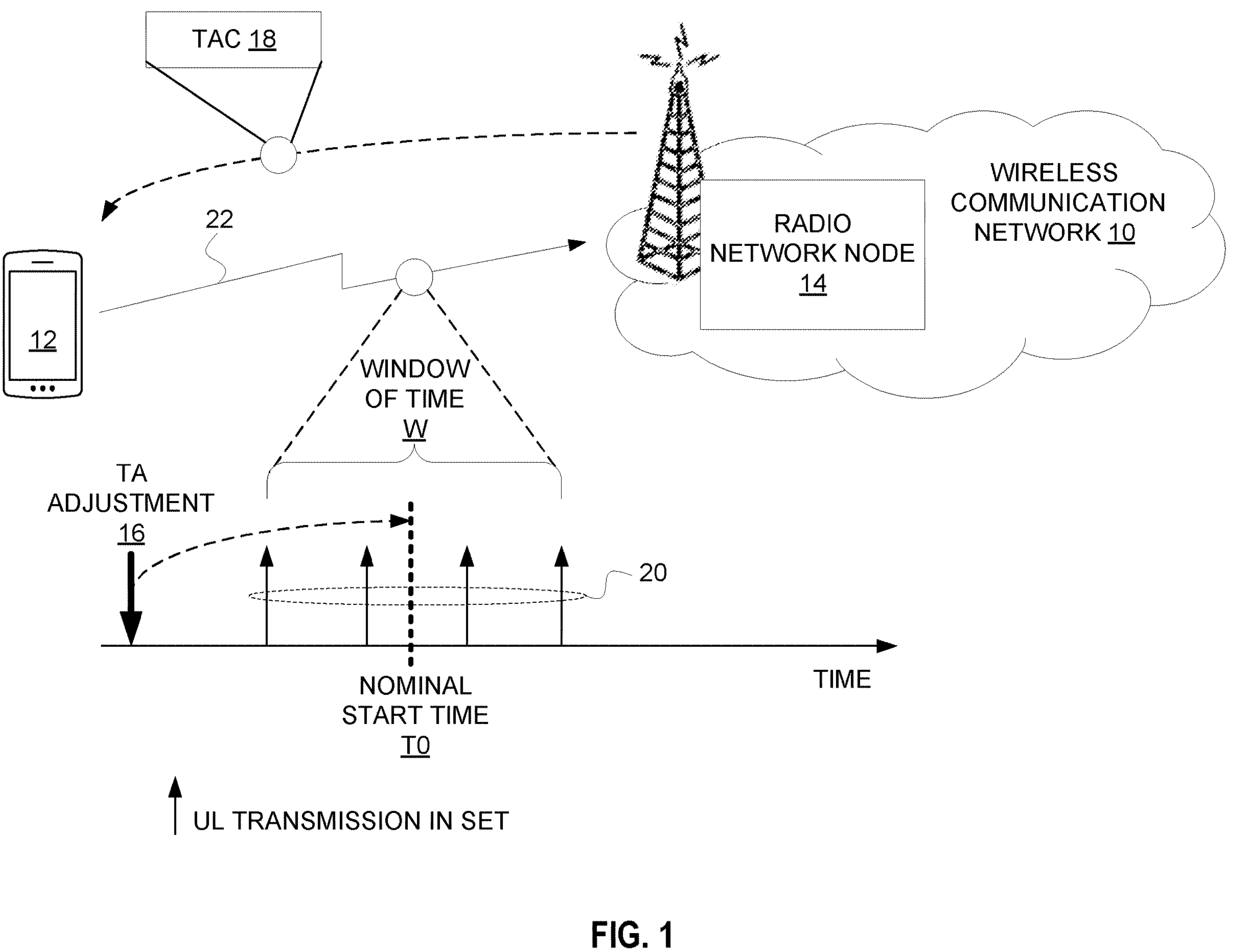
FIG. 1 is a block diagram of a wireless communication network according to some embodiments.

FIG. 1 shows a wireless communication network 10 that serves a wireless device 12 according to some embodiments. The wireless device 12 in this regard is configured to perform uplink transmissions on a carrier or bandwidth part provided by a radio network node 14. Here, a bandwidth part refers to a part of the total cell bandwidth of a cell provided by the radio network node 14.

As shown, the wireless device 12 obtains a timing advance adjustment 16. The timing advance adjustment comprises an adjustment to the uplink transmission timing of uplink transmissions on the carrier or bandwidth part, e.g., for purposes of uplink transmission time alignment at the radio network node 14. In some embodiments, for example, the wireless device 12 receives, from the radio network node 14, a timing advance command (TAC) 18 that commands the wireless device 12 to perform this adjustment to the uplink transmission timing of the uplink transmissions on the carrier or bandwidth part.

As shown, the adjustment to the uplink transmission timing is to be applied at a nominal start time TO. The nominal start time TO may for example be a beginning of an uplink slot that is a certain number of uplink slots after an uplink slot on which a TAC 18 was received. For instance, if the TAC 18 was received on uplink slot n, the nominal start time TO may be the beginning of uplink slot n+k+1.

However, the nominal start time TO occurs during a window of time W spanned by a certain set 20 of uplink transmissions, e.g., Physical Uplink Shared Channel (PUSCH) transmissions. Some of the uplink transmissions in this certain set 20 may for instance have been performed before the nominal start time TO whereas others of the uplink transmissions in the certain set 20 may be scheduled to occur after the nominal start time TO. Regardless, the uplink transmissions in the set 20 are restricted to having one or more of the same transmission parameters on the carrier or bandwidth part. Such one or more transmissions parameters may for instance comprise parameters that impact phase consistency of the uplink transmissions in the set 20. Indeed, the restriction may be in place so that there is phase consistency among the uplink transmissions in the set 20. In these and other embodiments, for example, the transmission parameter(s) may include one or more of: a modulation order, a resource block (RB) allocation in terms of length and frequency position, transmission power level, and an uplink beam.

In some embodiments, the transmission parameter restriction and resulting phase consistency facilitates joint channel estimation across the uplink transmissions in the set 20. In fact, in one or more embodiments, the uplink transmissions in the set 20 are associated with demodulation reference signals (DMRS) in a bundle and/or are transmitted during time slots in a bundle. In one embodiment, for example, the window of time W spanned by the set of uplink transmissions 20 includes a bundle of time slots, where the uplink transmissions in the set 20 are to be performed during respective ones of the time slots in the bundle. Such slot bundling and/or DMRS bundling for joint channel estimation provides improved channel estimation for reception of the uplink transmissions in the set 20.

In this context, the wireless device 12 is to perform an uplink transmission 22 on the carrier or bandwidth part at or after the nominal start time TO as part of, or during the window of time W spanned by, the set of uplink transmissions 20. In some embodiments, the uplink transmission 22 is one of the uplink transmissions in the set 20, whereas in other embodiments the uplink transmission 22 is not one of the uplink transmissions in the set 20.

The wireless device 12 according to embodiments herein correspondingly determines an uplink transmission timing of the uplink transmission 22 that is to be performed. Notably, the wireless device 12 determines this uplink transmission timing based on one or more rules that specify (i) the uplink transmission timing of the uplink transmission 22 is to be adjusted according to the timing advance adjustment 16 if one or more first conditions are met; and (ii) the uplink transmission timing of the uplink transmission 22 is not to be adjusted according to the timing advance adjustment 16 if one or more second conditions are met. Accordingly, rather than unconditionally applying the timing advance (TA) adjustment 16 at the nominal start time TO despite the nominal start time TO being during the window of time W spanned by the set of uplink transmission 20, and rather than unconditionally avoiding application of the timing advance (TA) adjustment 16 at the nominal start time TO because the nominal start time TO occurs during the window of time W spanned by the set of uplink transmission 20, the wireless device 12 may selectively apply the timing advance adjustment 16 to at least some transmissions (e.g., uplink transmission 22) that are to occur during the window of time W under at least some conditions. In doing so, some embodiments facilitate time-aligned reception of at least some uplink transmissions while at the same time preserving the ability of the radio network node 14 to perform joint channel estimation despite uplink transmission timing adjustment.

For example, in some embodiments, the one or more first conditions include a first condition that is met if the uplink transmission 22 is to be performed during the window of time W spanned by the set of uplink transmissions 20 but is not performed as part of the set of uplink transmissions 20, and the one or more second conditions include a second condition that is met if the uplink transmission 22 is to be performed as part of the set of uplink transmissions 20.

Alternatively or additionally, where the window of time W spanned by the set of uplink transmissions 20 includes a bundle of time slots, the one or more first conditions may include a first condition that is met if the uplink transmission 22 is to be performed during the window of time W spanned by the set of uplink transmissions 20 but not during a time slot in the bundle, and the one or more second conditions include a second condition that is met if the uplink transmission 22 is to be performed during a time slot in the bundle.

Alternatively or additionally, the one or more first conditions may include a first condition that is met if the uplink transmission 22 is to be performed on a first physical channel of the carrier or bandwidth part, and the one or more second conditions may include a second condition that is met if the uplink transmission 22 is to be performed on a second physical channel of the carrier or bandwidth part. In one such embodiment, uplink transmissions performed on the first physical channel are performed as part of the set of uplink transmissions 20, and uplink transmissions performed on the second physical channel are not performed as part of the set of uplink transmissions 20.

Alternatively or additionally, in some embodiments, the one or more first conditions include a first condition that is met if the uplink transmission 22 is to be performed on a first transmit chain of the wireless device 12, and the one or more second conditions include a second condition that is met if the uplink transmission 22 is to be performed on a second transmit chain of the wireless device 12.

Alternatively or additionally, in some embodiments, the one or more first conditions include a first condition that is met if an amount by which the wireless device 12 is to adjust the uplink transmission timing according to the timing advance adjustment 16 is smaller than a threshold amount, and the one or more second conditions include a second condition that is met if the amount by which the wireless device 12 is to adjust the uplink transmission timing according to the timing advance adjustment 16 is larger than the threshold amount.

Alternatively or additionally, in some embodiments, the one or more first conditions include a first condition that is met if an amount by which the wireless device 12 is to adjust the uplink transmission timing according to the timing advance adjustment 16 is larger than a threshold amount, and wherein the one or more second conditions include a second condition that is met if the amount by which the wireless device 12 is to adjust the uplink transmission timing according to the timing advance adjustment 16 is smaller than the threshold amount.

Alternatively or additionally, in some embodiments, the one or more first conditions include a first condition that is met if the wireless device 12 is to increase advancement of the uplink transmission timing of uplink transmissions on the carrier or bandwidth, and the one or more second conditions include a second condition that is met if the wireless device is to decrease advancement of the uplink transmission timing of uplink transmissions on the carrier or bandwidth.

Alternatively or additionally, in some embodiments, the one or more first conditions include a first condition that is met if the timing advance adjustment 16 is obtained by receiving a timing advance command 18 that indicates the timing advance adjustment, and the one or more second conditions include a second condition that is met if the timing advance adjustment is not obtained by receiving a timing advance command that indicates the timing advance adjustment.

Alternatively or additionally, in some embodiments, the one or more first conditions include a first condition that is met if signaling from a wireless communication network 10 indicates the uplink transmission timing of the uplink transmission 22 is to be adjusted according to the timing advance adjustment, and the one or more second conditions include a second condition that is met if no signaling from the wireless communication network indicates the uplink transmission timing of the uplink transmission is to be adjusted according to the timing advance adjustment.

In view of the embodiments herein, FIG. 2 depicts a method performed by a wireless device 12 in accordance with particular embodiments. The method includes obtaining a timing advance adjustment 16 that comprises an adjustment to an uplink transmission timing of uplink transmissions on a carrier or bandwidth part (Block 31). The adjustment to the uplink transmission timing is to apply beginning at a nominal start time TO.

The method also includes determining an uplink transmission timing of an uplink transmission 22 that is to be performed on the carrier or bandwidth part at or after the nominal start time TO as part of, or during a window of time W spanned by, a set of uplink transmissions 20 that are restricted to having one or more of the same transmission parameters on the carrier or bandwidth part (Block 32). The uplink transmission timing is determined based on one or more rules. In some embodiments, the one or more rules specify (i) the uplink transmission timing of the uplink transmission 22 is to be adjusted according to the timing advance adjustment 16 if one or more first conditions are met, and (ii) the uplink transmission timing of the uplink transmission 22 is not to be adjusted according to the timing advance adjustment 16 if one or more second conditions are met.

The method further comprises performing the uplink transmission 22 on the carrier or bandwidth part with the determined uplink transmission timing (Block 33).

Other aspects of the method in FIG. 2 are enumerated in Group A Embodiments herein.

FIG. 3 depicts a method performed by a radio network node 14 in accordance with other particular embodiments. The method includes transmitting, to a wireless device 12, signaling that configures the wireless device 12 to determine, based on one or more rules, an uplink transmission timing of an uplink transmission 22 to be performed on a carrier or bandwidth part at or after a nominal start time TO as part of, or during a window of time W spanned by, a set of uplink transmissions 20 that are restricted to having one or more of the same transmission parameters on the carrier or bandwidth part (Block 41). In some embodiments, the one or more rules specify (i) the uplink transmission timing of the uplink transmission 22 is to be adjusted according to the timing advance adjustment 16 if one or more first conditions are met; and (ii) the uplink transmission timing of the uplink transmission 22 is not to be adjusted according to the timing advance adjustment 16 if one or more second conditions are met.

The method may also include receiving the uplink transmission 22, e.g., with the determined uplink transmission timing (Block 42).

Other aspects of the method in FIG. 3 are enumerated in Group B Embodiments herein.

Still other embodiments herein include other methods enumerated in the Group A Embodiments and Group B Embodiments herein. The methods in the Group A Embodiments and Group B Embodiments herein may be implemented separately from or in conjunction with one another.

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
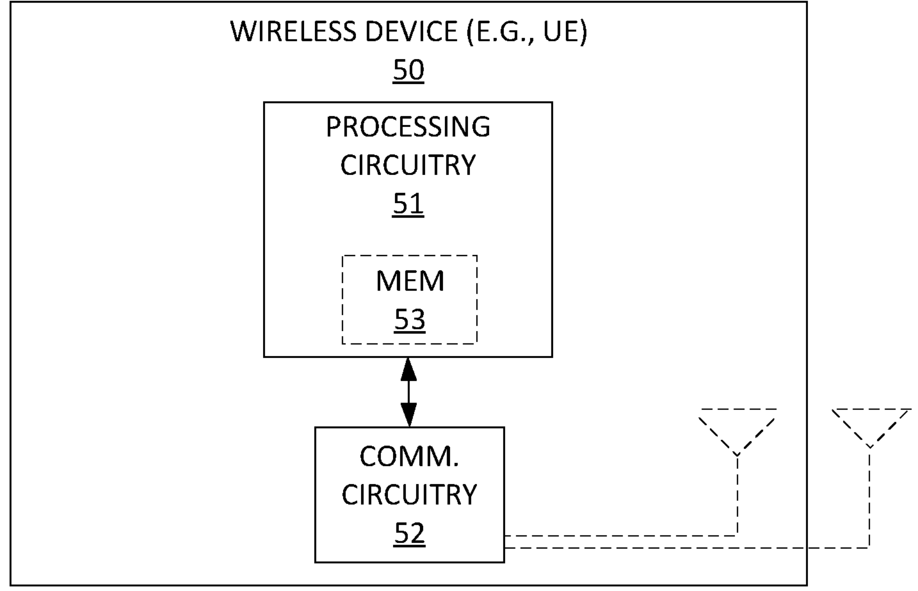
FIG. 4 is a block diagram of a wireless device according to some embodiments.

FIG. 4 for example illustrates a wireless device 50, e.g., wireless device 12, as implemented in accordance with one or more embodiments. As shown, the wireless device 50 includes processing circuitry 51 and communication circuitry 52. The communication circuitry 52 (e.g., radio circuitry) is configured to transmit and/or receive information to and/or from one or more other nodes, e.g., via any communication technology. Such communication may occur via one or more antennas that are either internal or external to the wireless device 50. The processing circuitry 51 is configured to perform processing described above, e.g., in FIG. 2, such as by executing instructions stored in memory 53. The processing circuitry 51 in this regard may implement certain functional means, units, or modules.

Figure 5:
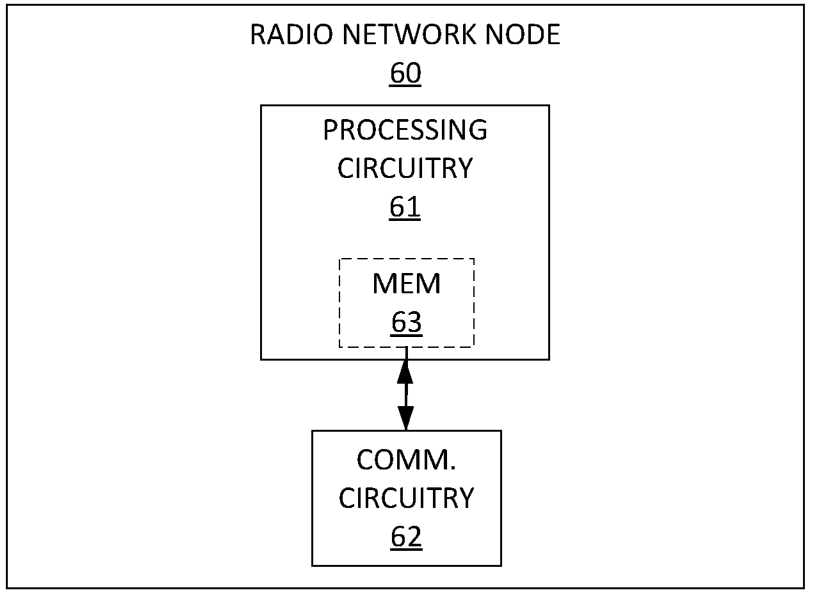
FIG. 5 is a block diagram of a radio network node according to some embodiments.

FIG. 5 illustrates a radio network node 60, e.g., radio network node 14, as implemented in accordance with one or more embodiments. As shown, the radio network node 60 includes processing circuitry 61 and communication circuitry 62. The communication circuitry 62 is configured to transmit and/or receive information to and/or from one or more other nodes, e.g., via any communication technology. The processing circuitry 61 is configured to perform processing described above, e.g., in FIG. 3, such as by executing instructions stored in memory 63. The processing circuitry 61 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Some embodiments herein are applicable in the context described below.

Uplink Time Adjustment

Timing Advance (TA)

It is important that signals from different UEs are time-aligned when received by the base station (BS). For example, received PUSCH OFDM symbols from different UEs should start and end simultaneously within a misalignment tolerance that is (significantly) less than the duration of the OFDM cyclic prefix (CP).

One reason for this being important is that if the misalignment is larger than the CP, there will typically be inter-subcarrier interference, i.e., nominally frequency-separated signals can interfere with each other. Also, misalignment could lead to an interference level that varies throughout the duration of an OFDM symbol. Such variation is challenging from a receiver algorithm perspective and could require increased receiver computational complexity as well as ultimately degrade performance. Furthermore, even without interference, the timing misalignment would mean that the BS would not be able to use the same DFT for all users in the cell, which would again lead to increased receiver computational complexity.

In order to ensure that signals are received time-aligned, it is not enough that UEs transmit at the same time; due to differences in propagation delays between different UEs depending on how far from the BS they are located, adjustments are necessary. This is illustrated in parts a) and b) of FIG. 6. FIG. 6 schematically shows a) exemplary Tx and Rx times for UEs with different distance to the BS for the case of b) no timing advance or c) appropriate timing advance. “Packet A” and “Packet B” could e.g., represent one transmitted slot. A UE that is far from the BS must be instructed to transmit a certain time in advance in order for the signal to reach the BS at the right time. This functionality is in NR referred to as timing advance (TA) and is described for example in 3GPP TS 38.213 and 3GPP TS 38.321, and is illustrated in part c) of FIG. 6.

According to 3GPP TS 38.213 rev 16.4.0, the TA can be adjusted in multiples of $16\cdot64\cdot T_c/2^\mu$, where $T_c=1/(\Delta f_{max}\cdot N_f)$, $\Delta f_{max}=480\cdot10^3$ Hz and $N_f=4096$. In other cases than random access response, a timing advance command (3GPP TS 38.321), $T_A$, for a timing advance group (TAG) indicates adjustment of a current $N_{TA}$ value, $N_{TA\_old}$, to the new $N_{TA}$ value, $N_{TA\_new}$, by index values of $T_A=0, 1, 2, \ldots, 63$, where for a SCS of $2^\mu\cdot15$ kHz, $N_{TA\_new}=N_{TA\_old}+(T_A-31)\cdot16\cdot64/2^\mu$. Adjustment of an $N_{TA}$ value by a positive or a negative amount indicates advancing or delaying the uplink (UL) transmission timing for the TAG by a corresponding amount, respectively.

The TA granularity for 15 kHz subcarrier spacing is about 0.52 μs and for higher subcarrier spacings scales inversely with the subcarrier spacing. In the present disclosure, we for brevity define $\Delta T_0=16\cdot64\cdot T_c/2^\mu$. In the case of random access response, the TA can be set to any value in the range $0\times\Delta T_0$, $1\times\Delta T_0$, $2\times\Delta T_0$, . . . , $3846\times\Delta T_0$. In other situations, relative TA adjustments in the range $-31\times\Delta T_0$, $-30\times\Delta T_0$, . . . $0\times\Delta T_0$, . . . $+31\times\Delta T_0$, $+32\times\Delta T_0$ can be set. The maximum TA adjustment is 16.67 μs, about one fourth of an OFDM symbol length.

According to the following table from 3GPP TS 38.211 rev 16.4.0, different cyclic prefixes are supported.

TABLE 4.2-1

Supported transmission numerologies.

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Cyclic prefix (CP) length is denoted by $$N^\mu_{CP,l} * T_c,$$

where $$N_u^\mu = 2048\kappa\cdot2^{-\mu}$$

$$N^\mu_{CP,l} = \begin{cases} 512\kappa\cdot2^{-\mu} & \text{extended cyclic prefix} \\ 144\kappa\cdot2^{-\mu}+16\kappa & \text{normal cyclic prefix, } l=0 \text{ or } l=7\cdot2^\mu \\ 144\kappa\cdot2^{-\mu} & \text{normal cyclic prefix, } l\neq0 \text{ or } l\neq7\cdot2^\mu \end{cases}$$

The constant $\kappa=T_s/T_c=64$. We denote $x\cdot\Delta T_0$ as relative TA adjustment. $x=T_A-31$, where $T_A=0, 1, 2, \ldots, 63$ is index value in TAC. The UE applies TA adjustment before its UL transmission, which may happen at any symbol in a slot. In order for the relative TA adjustment $x\cdot\Delta T_0$ to be within CP range, x should meet below requirement:

$$|x| \le \begin{cases} 32, \text{ extended } CP \\ 9+2^\mu, \text{ normal } CP, l=0 \text{ or } l=7\cdot2^\mu \\ 9, \text{ normal } CP, l\neq0 \text{ and } l\neq7\cdot2^\mu \end{cases}$$

where |x| is the absolute value of x. That means the maximum absolute value of relative TA adjustment $32\times\Delta T_0$ doesn’t exceed an extended CP. But for normal CP, take the example of 15 kHz, i.e. μ=0. If the value x derived from the TA command is between [−10, +10], the TA adjustment is within CP length for the first symbol of the slot. If the value is in the range [−31, −9] or [11, 32], the TA is larger than the CP.

Figure 7:
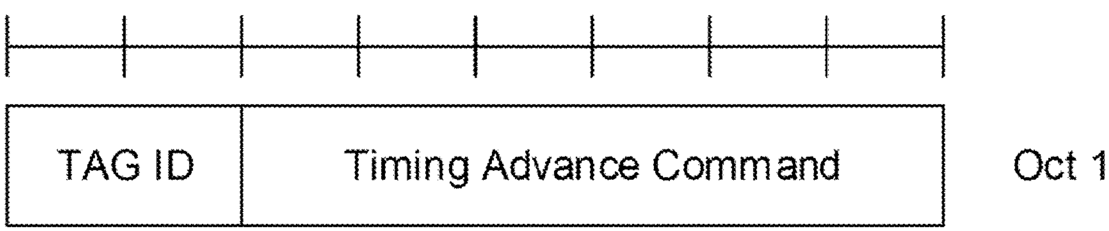
FIG. 7 schematically shows an exemplary Timing Advance Command MAC CE, which is a figure from 3GPP TS 38.321 V16.3.0.

The timing advance is in NR Rel-15/16 signaled using a TA Medium Access Control (MAC) Control Element (CE) as described in section 6.1.3.4 of 3GPP TS 38.321. One octet is used for signaling as shown in FIG. 7. FIG. 7 schematically shows an exemplary Timing Advance Command MAC CE, which is a figure from 3GPP TS 38.321 V16.3.0. Six bits are used to indicate one of the above-mentioned 64 possible relative TA adjustments. Two bits are used to indicate a timing advance group (TAG) identity (ID). TAGs can be useful to specify the same TA for multiple cells, e.g., for a multi-carrier system where the same UE is served by the same BS in multiple cells operating on the different carrier frequencies.

When the UE receives a TA adjustment command (TAC), it should in Rel-15/16 of NR update the TA essentially immediately, with just a short delay to allow for processing time, etc. More precisely, according to 3GPP TS 38.213 rev 16.4.0, if the UE receives a TA command in slot n, the new TA should apply from the beginning of the uplink slot n+k+1, where $$k = \lceil N_{slot}^{subframe,\mu}\cdot(N_{T,1}+N_{T,2}+N_{TA,max}+0.5)/T_{sf}\rceil,\ N_{T,1}$$

is a time duration in msec of N symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1, $N_{TA,max}$ is the maximum timing advance value in msec that can be provided by a TA command field of 12 bits, $$N_{slot}^{subframe,\mu}$$

is the number of slots per subframe, and $T_{sf}$ is the subframe duration of 1 msec. $N_1$ and $N_2$ are determined with respect to the minimum SCS among the SCSs of all configured UL BWPs for all uplink carriers in the TAG and of all configured downlink (DL) BWPs for the corresponding downlink carriers.

If the received downlink timing changes and is not compensated or is only partly compensated by the uplink timing adjustment without timing advance command as described in TS 38.133, the UE changes $N_{TA}$ accordingly.

In 3GPP TS 38.133 rev 17.0.0, the downlink timing is defined as the time when the first detected path (in time) of the corresponding downlink frame is received from the reference cell.

UE transmission timing is adjusted using gradual timing adjustments described in section 7.1.2.1 of 3GPP TS 38.133. When it is not the first transmission in a DRX cycle or there is no DRX cycle, and when it is the transmission for PUCCH, PUSCH and SRS transmission, the UE shall be capable of changing the transmission timing according to the received downlink frame of the reference cell except when the timing advance in section 7.3 of 3GPP TS 38.133 is applied.

Gradual Timing Adjustment

According to section 7.1.2.1 of 3GPP TS 38.133, requirements in this section apply regardless of whether the reference cell is on a carrier frequency subject to Clear Channel Assessment (CCA) or not.

When the transmission timing error between the UE and the reference timing exceeds $\pm T_e$ then the UE is required to adjust its timing to within $\pm T_e$. The reference timing shall be $(N_{TA}+N_{TA\ offset})\times T_c$ before the downlink timing of the reference cell. All adjustments made to the UE uplink timing shall follow these rules:

1) The maximum amount of the magnitude of the timing change in one adjustment shall be $T_q$.

2) The minimum aggregate adjustment rate shall be $T_p$ per second.

3) The maximum aggregate adjustment rate shall be $T_q$ per 200 ms. where the maximum autonomous time adjustment step $T_q$ and the aggregate adjustment rate $T_p$ are specified in Table 7.1.2.1-1.

TABLE 7.1.2.1-1

$T_q$ Maximum Autonomous Time Adjustment Step and $T_p$ Minimum Aggregate Adjustment rate

| Frequency Range | SCS of uplink signals (kHz) | $T_q$ | $T_p$ |
|---|---|---|---|
| 1 | 15 | $5.5*64*T_c$ | $5.5*64*T_c$ |
| | 30 | $5.5*64*T_c$ | $5.5*64*T_c$ |
| | 60 | $5.5*64*T_c$ | $5.5*64*T_c$ |
| 2 | 60 | $2.5*64*T_c$ | $2.5*64*T_c$ |
| | 120 | $2.5*64*T_c$ | $2.5*64*T_c$ |

NOTE:
$T_c$ is the basic timing unit defined in TS 38.211 [6]

Timing Advance Adjustment Delay

UE shall adjust the timing of its uplink transmission timing at time slot n+k+1 for a timing advance command received in time slot n, and the value of k is defined in clause 4.2 in 3GPP TS 38.213. The same requirement applies also when the UE is not able to transmit a configured uplink transmission due to the channel assessment procedure.

Figure 8:
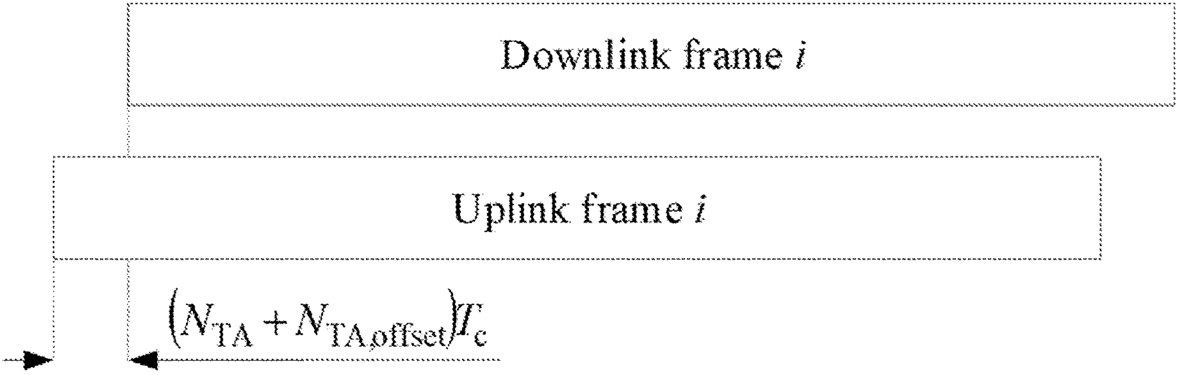
FIG. 8 schematically shows an exemplary Uplink-downlink timing relation.

3GPP TS 38.211 rev 16.4.0 specifies that uplink frame number i for transmission from the UE shall start $T_{TA}=(N_{TA}+N_{TA,offset})T_c$ before the start of the corresponding downlink frame at the UE where $N_{TA,offset}$ is given by 3GPP TS 38.213. FIG. 8 reproduces FIG. 4.3.1-1 from 3GPP TS 38.211 rev 16.4.0, which schematically shows an exemplary Uplink-downlink timing relation.

```
--------------- Start of text from 38.331 rev 16.3.1-----------------
ServingCellConfigCommon ::=                SEQUENCE {
  physCellId                               PhysCellId
OPTIONAL, -- Cond HOAndServCellAdd,
  downlinkConfigCommon                       DownlinkConfigCommon
OPTIONAL, -- Cond HOAndServCellAdd
  uplinkConfigCommon                       UplinkConfigCommon
OPTIONAL, -- Need M
  supplementaryUplinkConfig                  UplinkConfigCommon
OPTIONAL, -- Need S
  n-TimingAdvanceOffset                    ENUMERATED { n0, n25600, n39936 }
OPTIONAL, -- Need S
...
n-TimingAdvanceOffset
The N_TA-Offset to be applied for all uplink transmissions on this serving cell.
If the field is absent, the UE applies the value defined for the duplex mode
and frequency range of this serving cell. See TS 38.133, table 7.1.2-2.
...
                                        TAG-Config information element
-- ASN1START
-- TAG-TAG-CONFIG-START
TAG-Config ::= SEQUENCE {
tag-ToReleaseList SEQUENCE (SIZE (1..maxNrofTAGs)) OF TAG-Id
OPTIONAL, -- Need N
tag-ToAddModList SEQUENCE (SIZE (1..maxNrofTAGs)) OF TAG
OPTIONAL -- Need N
}
TAG ::= SEQUENCE {
tag-Id TAG-Id,
timeAlignmentTimer TimeAlignmentTimer,
...
}
TAG-Id ::= INTEGER (0..maxNrofTAGs-1)
TimeAlignmentTimer ::= ENUMERATED {ms500, ms750, ms1280, ms1920,
ms2560, ms5120, ms10240, infinity}
```

-continued

```
-- TAG-TAG-CONFIG-STOP
-- ASN1STOP
...
timeAlignmentTimer
Value in ms of the timeAlignmentTimer for TAG with ID tag-Id, as specified in
TS 38.321.
-------------- End of text from 38.331 rev 16.3.1----------------
```

In 3GPP TS 38.321 rev. 16.4.0, it is specified that RRC configures the following parameters for the maintenance of UL time alignment:

timeAlignmentTimer (per TAG) which controls how long the MAC entity considers the Serving Cells belonging to the associated TAG to be uplink time aligned.

According to 3GPP TS 38.321 rev. 16.4.0, a Timing Advance Group (TAG) is a group of Serving Cells that is configured by RRC and that, for the cells with a UL configured, uses the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.

PUSCH Repetition and TBoMS

PUSCH Repetition in NR Rel-15

Slot aggregation for the Physical Uplink Shared Channel (PUSCH) is supported in Rel-15 and was renamed to PUSCH Repetition Type A in Rel-16. The name PUSCH repetition Type A is used even if there is only a single repetition, i.e., no slot aggregation. In Rel. 15, a PUSCH transmission that would overlap with DL symbols is not transmitted.

- For DCI granted multi-slot transmission (PDSCH/PUSCH) vs. semi-static DL/UL assignment
  - If semi-static DL/UL assignment configuration of a slot has no direction conflict with scheduled PDSCH/PUSCH assigned symbols, the PDSCH/PUSCH in that slot is received/transmitted
  - If semi-static DL/UL assignment configuration of a slot has direction conflict with scheduled PDSCH/PUSCH assigned symbols, the PDSCH/PUSCH transmission in that slot is not received/transmitted, i.e., the effective number of repetitions reduces In Rel. 15, the number of repetitions is semi-statically configured by RRC parameter pusch-AggregationFactor. At most 8 repetitions are supported.

pusch-AggregationFactor ENUMERATED {n2, n4, n8}

PUSCH Repetition in NR Rel-16

A new repetition format PUSCH repetition Type B is supported in Rel-16, which allows back-to-back repetition of PUSCH transmissions. The biggest difference of Type B from Type A is that repetition Type A only allows a single repetition in each slot, with each repetition occupying the same symbols. Using this format with a PUSCH length shorter than 14 introduces gaps between repetitions, increasing the overall latency. The other change compared to Rel. 15 is how the number of repetitions is signaled. In Rel. 15, the number of repetitions is semi-statically configured, while in Rel. 16 the number of repetitions can be indicated dynamically in DCI. This applies both to dynamic grants and configured grants type 2.

Transmission of Transport Block Over Multiple Slot (TBoMS)

In NR Rel-15/16, one UL TB is confined to the UL symbols in a slot. To support high data rate, multiple Physical Resource Blocks (PRBs) in a slot can be used for the transmission of a large TB and the multiple PRBs share UE transmission power. Transport block (TB) processing over multiple slots may be possible for coverage enhancement of PUSCH in NR Rel-17. Multi-slot TB extends the time domain resource for the transmission of a TB across slot border to increase total power for transmission of a TB compared to TB transmission in a single slot. Multi-slot TB also reduces cyclic redundancy check (CRC) overhead by reducing the number of CRCs in a given number of slots compared to the PUSCH transmissions at the same data rate with separate TBs.

TA and Cross-Slot Channel Estimation

In an NR gNB, the reception of the Physical Uplink Shared Channel (PUSCH) on a high level typically consists of two steps: (i) estimation of the physical channel based on measurements of reference symbols (e.g., DMRS) and (ii) equalize, demodulate, and decode the signal based on the so estimated channel.

In existing releases of NR (Rel-15/16), the gNB performs the channel estimation (or at least the channel filtering part of it) on each slot individually, since different slots may have different random phase offsets, timing differences, and/or other differences that may make cross-slot channel filtering impossible.

Rel-17 Enhancements

In the NR coverage enhancements work item (WI) for Rel-17, it has been agreed to support PUSCH cross-slot channel estimation, or joint channel estimation as it is called in 3GPP; the two terms will mostly be treated as synonyms herein. Joint channel estimation imposes some constraints on the UE regarding phase changes etc., between slots in order to allow the gNB to estimate the channel jointly for multiple slots. Such joint processing over multiple slots can improve the channel estimation quality, and thereby improve overall link and system performance.

The description herein refers to a set of slots intended for joint channel estimation as a set of bundled slots or a slot bundle. A set of bundled slots would typically be a few consecutive slots in which the UE transmits a physical channel, e.g., all slots of a repetitions set (see section 6.3 of 3GPP TS 38.214 for more information on repetition), all slots of a single transport block (TB) transmission, or a predetermined set of slots identified by their location in time during which the UE must maintain relative phase among transmissions in the slots. In more general cases, a slot bundle comprises those slots over which a UE is to maintain the relative phase between transmissions in the different slots. Such cases may for example include where the UE does not transmit, but also does not receive a downlink transmission, and so may keep its Tx chain active without degrading its downlink reception with self-interference.

Mechanism(s) are desired to enable joint channel estimation over multiple PUSCH transmissions, based on conditions to keep power consistency and phase continuity. As noted above, cross-slot channel estimation would involve certain constraints on timing changes in the UE's transmissions between slots that are jointly processed.

One approach to constraining timing changes between slots that are jointly processed would be to avoid, cancel, or postpone changes during a set of slots with joint channel estimation, so as to favor joint channel estimation over timing adjustment. Another approach would be to proceed with the timing changes at the expense of joint channel estimation, i.e., to effectively terminate joint channel estimation.

Figure 9:
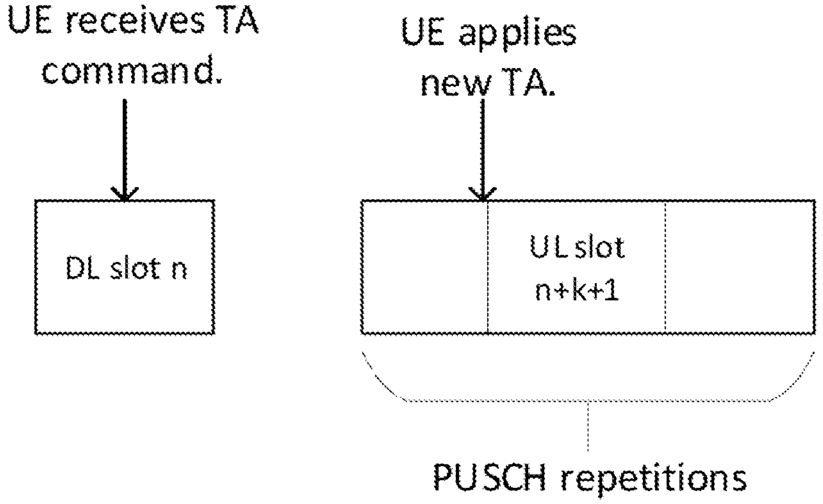
FIG. 9 schematically shows exemplary TA changes in the midst of PUSCH transmission in bundled slots.

More particularly in this regard, the UE heretofore applies a timing advance (TA) update at the start of slot n+k+1 after receiving a timing advance command in slot n. In NR Rel-17 such a TA change may occur in the middle of a set of bundled slots, which are configured by a gNB or predetermined for joint channel estimation. As illustrated in FIG. 9 which schematically shows exemplary TA changes in the midst of PUSCH transmission in bundled slots, bundled slots from a UE can be used for transmission of PUSCH repetitions and/or a TB over multiple slots. A change of TA in the middle of the bundled slots can degrade cross-slot channel estimation.

Figure 10:
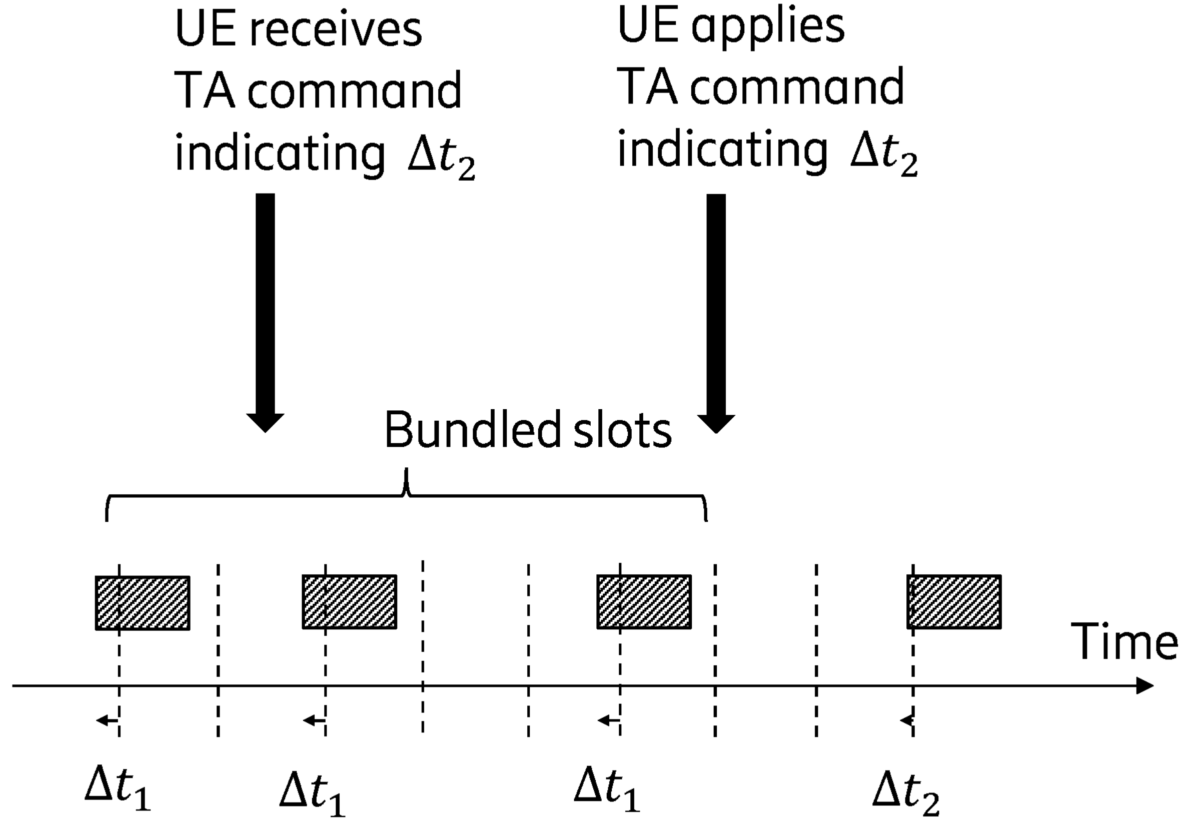
FIG. 10 schematically shows that a TA command received during a set of bundled slots is applied once the set of bundled slots is ended.

In order to preserve cross-slot channel estimation, then, one approach would be to have the UE avoid TA updates during a set of bundled slots. The UE in this approach, for example, could apply the update after the set of bundled slots (e.g., either immediately after the transmission finished, or just before the UL transmissions in any slot following the last bundled slot, which might be different if the change in TA would cause the two slots to overlap in principle). An example of application after the bundled slots is illustrated in FIG. 10. FIG. 10 schematically shows that a TA command received during a set of bundled slots is applied once the set of bundled slots is ended.

However, such avoidance may cause issues of inter-subcarrier interference and UE-UE interference. Indeed, as described above, for normal CP case, if the TA adjustment $x*\Delta T_0$ derived from TA command doesn't meet the requirement below, not adjusting TA accordingly will cause inter-subcarrier interference, i.e., nominally frequency-separated signals can interfere with each other.

$$|x| \le \begin{cases} 32, \text{ extended } CP \\ 9+2^{\mu}, \text{ normal } CP, l=0 \text{ or } l=7\cdot 2^{\mu} \\ 9, \text{ normal } CP, l\ne 0 \text{ and } l\ne 7\cdot 2^{\mu} \end{cases}$$

Figure 11:
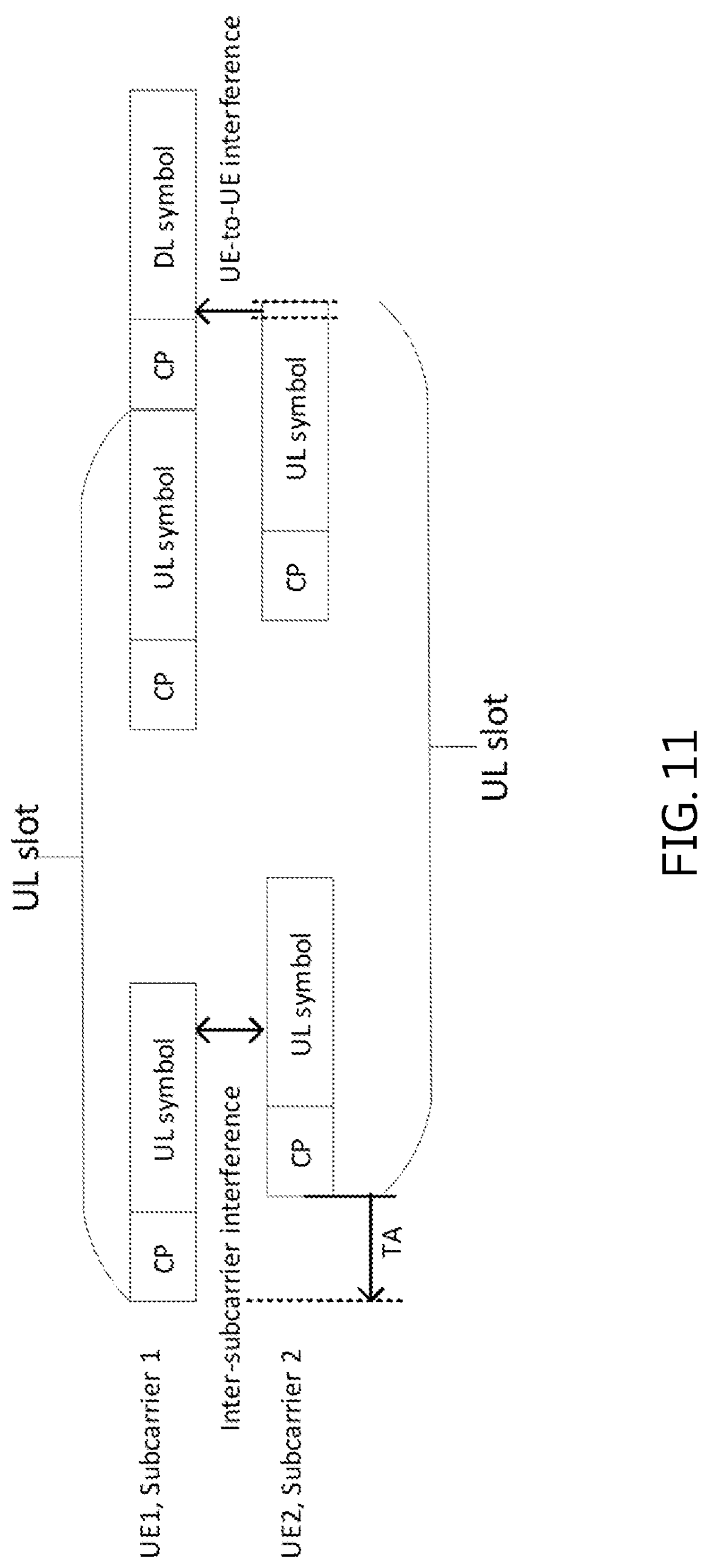
FIG. 11 schematically shows exemplary interference caused by no TA adjustment.

In the configuration of DDSUUDDSUU, for example, if the UE moves around a street corner, it could suddenly have a strong line-of-sight (LOS) path to the BS with much shorter propagation delay than it previously had, and the TA should be enlarged. Keeping a smaller TA will make the UL transmission extend into the next DL slot (if UE uses the last symbol in the UL slot) and gNB will not be able to receive the last several symbols of the UL slot, since the gNB has started DL transmission. The UE also causes UE-UE interference, as illustrated in FIG. 11. FIG. 11 schematically shows exemplary interference caused by no TA adjustment. If the UE then avoids updating the TA to compensate for that, it could for a period of time cause severe interference to other users, who are receiving DL data, due to the timing misalignment at the receiver. When the TA adjustment error exceeds CP length, not updating TA causes inter-subcarrier interference unless there is no other UE scheduled in the slot.

Note that if the number of bundled slots exceeds the number of HARQ re-transmissions used in the system (and the HARQ feedback delay is less than the time interval between consecutive UL slots, which may be the case in TDD), the interference from the wrong TA setting could affect all transmission attempts of another user and hence potentially lead to need for re-transmissions by higher layers, which is costly.

Certain aspects of the present disclosure and their embodiments may provide solutions to these or other challenges. For example, some embodiments define certain rules for when the UE should or should not update its TA setting in order to avoid that the UE unnecessarily disrupts cross-slot channel estimation or causes other issues. Generally, in certain situations, the UE should update the TA only after the set of bundled slots. However, in other situations, it is more beneficial to update the TA already before the end of a set of bundled slots and to have the gNB take this TA change into account when receiving the bundled slots.

Certain embodiments may provide one or more of the following technical advantage(s). The network can signal TA to the UE at any time without risking that joint channel estimation over multiple slots fails and without risking issues from delayed application of an updated TA.

More specifically, the description herein for brevity refers to a set of slots intended or usable for joint channel estimation as a set of bundled slots or a slot bundle. The bundle could be formally specified as a "bundle" (or similar, e.g., as a time window, slot group, etc.), but need not necessarily be so. For example, "intended" could mean that the gNB plans to use the slots for joint estimation without the UE being aware of that, and "usable" could more generally mean that the system is configured in such a way (e.g., by signaling to a UE) that the slots will be usable for joint estimation by the gNB (again possibly without the UE being aware of this), or usable with less receiver computational complexity than would otherwise be needed.

A set of bundled slots would typically be a few consecutive slots in which the UE transmits a physical channel, e.g., all slots of a repetitions set (see section 6.3 of 3GPP TS 38.214 for more information on repetition), all slots of a single TB transmission, or a predetermined set of slots identified by their location in time during which the UE must maintain relative phase among transmissions in the slots. In more general cases, a slot bundle comprises those slots over which a UE can maintain the relative phase between transmissions in the different slots. Such cases may for example include where the UE does not transmit, but also does not receive a downlink transmission, and so may keep its Tx chain active without degrading its downlink reception with self-interference.

In this context, some embodiments herein introduce rules for when the UE should apply the TA update. That is, rather than the UE always and unconditionally avoiding TA updates during a set of bundled slots, the UE may selectively apply or not apply TA updates during such a set of bundled slots, e.g., depending on one or more conditions. Some embodiments therefore generally include methods for a UE to determine when it should or should not apply a TA, e.g., when a set of bundled slots is configured by gNB or predetermined for joint channel estimation, which can be used for transmission of PUSCH repetitions and/or a TB across multiple slots.

Embodiment 1-1: Apply a new TA on slots not for a PUSCH bundle, and keep using the old TA for all slots for a PUSCH bundle. For example, for a PUCCH transmitted in a slot that is between two PUSCH slots that are in a PUSCH bundle, a new TA can be used for the PUCCH slot, but the old TA should be used for the 2 slots which are assumed to be bundled for PUSCH transmission.

Generally, then, according to Embodiment 1-1, the UE can apply the updated TA to any transmissions that are not part of a set of bundled slots but transmitted in the same period of time (i.e., a transmission anywhere between the start of the first slot of a bundle and the end of the last slot of the bundle). For example, control channels or other PUSCH transmissions that do not use bundling, and that are transmitted in slots between the bundled slots, could be allowed to use the new TA even though the old TA persists for the slots that are part of an ongoing bundle.

The support for different TA timing could be used in UEs that have multiple transmit chains that can operate on the same carrier frequency. In such cases, the different transmit chains could transmit with different timing advances. In such UEs, it can be possible for the UE to select on which Tx chain it will transmit a given physical channel in a transparent way to the gNB. This is possible in NR because each physical channel transmitted from the UE has an associated antenna port and a corresponding DMRS that are generally independent of other physical channels. Physical channels transmitted on different antenna ports can be on different Tx chains. Therefore, in some embodiments, the UE selects a Tx chain to transmit a physical on according to whether a timing advance is to be applied to the Tx chain. If the physical channel is to be transmitted in a set of bundled slots, the channel is transmitted on a Tx chain that does not have the timing advance applied during the bundled slots, otherwise the UE transmits the physical channel on either a Tx chain that has the timing advance applied or on a Tx chain that does not have the timing advance applied.

Embodiment 1-2: Apply a new TA on physical channels according to whether they are configured for bundling, where if the TA is to be updated for bundled slots, and if the channel is not configured for bundling, the TA is updated. However, if the channel is instead configured for bundling, the TA is updated after the bundled slots.

Generally, then, according to Embodiment 1-2, a UE is configured to use slot bundling for a selected physical channel or cell on a bandwidth part.

Indeed, in some cases, it may not be necessary for the UE to maintain relative phase among slots (i.e., configured for slot bundling) for all physical channels transmitted on a given carrier. For example, it could be configured to maintain relative phase for its PUSCH and PUCCH transmissions independently. Such operations can be supported by the UE that has multiple Tx chains discussed above. Also, a gNB may not need the UE to maintain relative phase for a given physical channel, e.g., if it is at a high enough SINR such that the channel can estimated with sufficient accuracy, or if the gNB can estimate the relative phase between slots and to then use the multiple slots for enhanced channel estimation without the UE's assistance. Therefore, in some embodiments, a UE is configured to use slot bundling for a selected physical channel on a cell or bandwidth part. If the UE receives a TAC to apply to the carrier or bandwidth part, it will update the timing for a given physical channel according to if it is configured for slot bundling for that physical channel. If it is configured for slot bundling on the channel, it will not expect, and may choose to not adjust, a TAC that would cause it to adjust the TA of transmissions occurring within a slot bundle. If it is not configured for slot bundling on the channel, it will use the Rel-15/16 procedure for adjusting TA. In a similar embodiment, if the UE is configured for slot bundling on the channel and receives a TAC that would cause it to adjust the TA on transmissions occurring within a slot bundle, it adjusts the TA in a slot after the last of the bundled slots.

Figure 12:
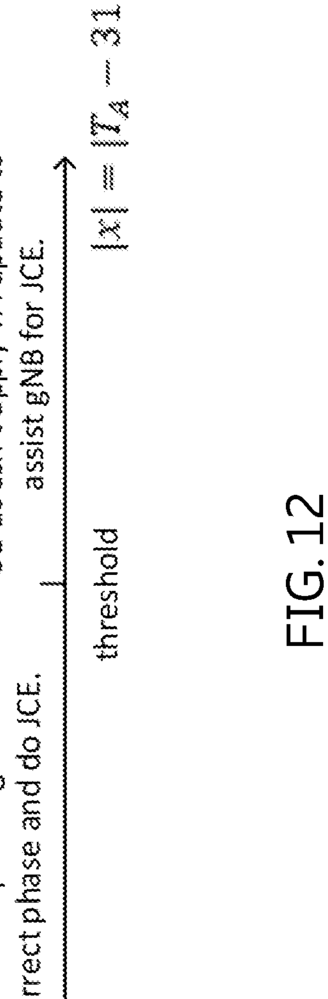
FIG. 12 schematically shows an exemplary UE behavior on TA update according to a threshold of gNB phase correction.

When configured with bundled slots, if the relative TA adjustment signaled in TAC is small, the UE can either apply the TA causing a small phase non-consistency which the gNB can correct before joint channel estimation, or maintain relative phase by not applying TA update to assist the gNB joint channel estimation, as illustrated in FIG. 12. FIG. 12 schematically shows an exemplary UE behavior on TA update according to the threshold of gNB phase correction.

In other embodiments herein, referred to as Embodiments 2-x, the UE applies a new TA or not based on to what extent a TA drift is detected.

Embodiment 2-0: The UE receives a TAC and the slot in which the UE is expected to apply the TA update is among the bundled slots. If the absolute value of x, based on $x=T_A-31$, where the TA is signaled in TAC, is less than a predetermined or configured threshold, the UE applies the TA update as required.

We denote $x\cdot\Delta T_0$ as relative TA adjustment. $x=T_A-31$, where $T_A=0, 1, 2, \ldots, 63$ is index value indicated in TAC. x derived from TA command is in the range of [−31, 32]. The relative TA adjustment can be larger than a normal CP length and cause inter-subcarrier interference. A UE needs to determine if such interference may happen if it doesn't apply the TA update as indicated in TAC.

Embodiment 2-1: With normal CP, for a timing advance command received on uplink slot n, if the UE transmits PUSCH in bundled slots, which overlap with the corresponding adjustment of the uplink transmission timing in uplink slot n+k+1, the UE can be configured/predetermined to use below method.

If the value x indicated in a TA command doesn't meet the requirement, $$|x| \le \begin{cases} 9+2^{\mu}, \text{ normal } CP, l=0 \text{ and } l=7\cdot 2^{\mu} \\ 9, \text{ normal } CP, l\ne 0 \text{ and } l\ne 7\cdot 2^{\mu} \end{cases} \quad (1)$$

where μ is defined in section 4.2 in 3GPP TS 38.211 and lxi is the absolute value of x, the UE adjusts the TA command in slot n+k+1 accordingly and is not required to maintain relative phase among PUSCH transmissions in a bundle. The gNB may therefore be unable to do joint channel estimation for the UE across slots before and after the beginning of slot n+k+1.

Embodiment 2-2: The TA update is applied at one point in time if it is an increase in TA, and another point in time if it is a decrease in TA. For example, a rule may be that the TA is applied according to Rel-15/16 specification in case it is an increase, and at a later point in time if it is a decrease, or vice versa. The time of application may also more generally depend on how large the TA change is. For example, a TA change that is larger than a certain threshold (in either direction or in some specific direction) is applied rather soon (e.g., according to Rel-15/16) while a smaller TA change is applied only after the completion of the slot bundle (or before the first slot or symbol after the slot bundle).

In the general case, there may be two different thresholds, one which determines how large a TA decrease has to be in order to trigger an early update, and one which determines how large a TA increase has to be in order to trigger an early update.

One example of why it could be beneficial to have different thresholds for increase vs decrease of TA: A transmission of an OFDM symbol consists of a CP of duration T_CP followed by the actual OFDM symbol of duration T_OFDM. The receiver DFT window, which has duration T_OFDM, could in an environment without time dispersion in theory be aligned to start at any time instance from the beginning of the CP until the beginning of the actual OFDM symbol. However, if the physical channel has time dispersion with a distance from first to last channel tap of about T_CP, the receiver should in order to avoid inter-symbol interference from the preceding OFDM symbol preferably align its DFT window so that it starts late in the CP, or right at the start of the actual OFDM symbol. Assuming such alignment of the receiver DFT window, and considering that physical channels typically have the strongest taps in the beginning of the channel profile and mostly very weak taps towards the end, it is clear that it may be more problematic if a UE transmits a little too early than if it transmits a little too late: If it transmits a little too early, the first CP of the slot will cause interference by having its first (and presumably strong) channel tap(s) being captured by the DFT window for the last symbol of the previous slot, while if it transmits a little too late, it will only cause interference by having its last (and presumably weak) channel tap(s) being captured by the DFT window for the first symbol in the following slot. Hence, application of a TA may be more important to perform urgently for small/moderate TA changes if the TA is decreased (which happens if the UE is transmitting too early) than if it is increased (which happens if the UE is transmitting too late). Therefore, it could be beneficial to have a smaller threshold for an decrease in TA.

Embodiment 3: Shorten a slot on which a new TA is expected to be applied but still the old TA is applied for cross-slot channel estimation. For example, in some embodiments, a slot that should have an updated TA according to Rel-15/16 is transmitted with a non-updated TA but shortened (at the beginning or the end). The shortening could be adjusted to match the TA change so that undesired interference between symbols or slots between different UEs does not risk arising at the gNB receiver, i.e., if the TA is enlarged (earlier transmission) the slots would be shortened (punctured) at the end and if the TA is reduced (later transmission) the slots would be shortened (punctured) at the beginning. Alternatively to shortening to match the TA change, an entire OFDM symbol or even an entire slot could be not transmitted by the UE. Note that if a TA command is received early in the bundle, several slots may be affected by such shortening or omissions.

Figure 13:
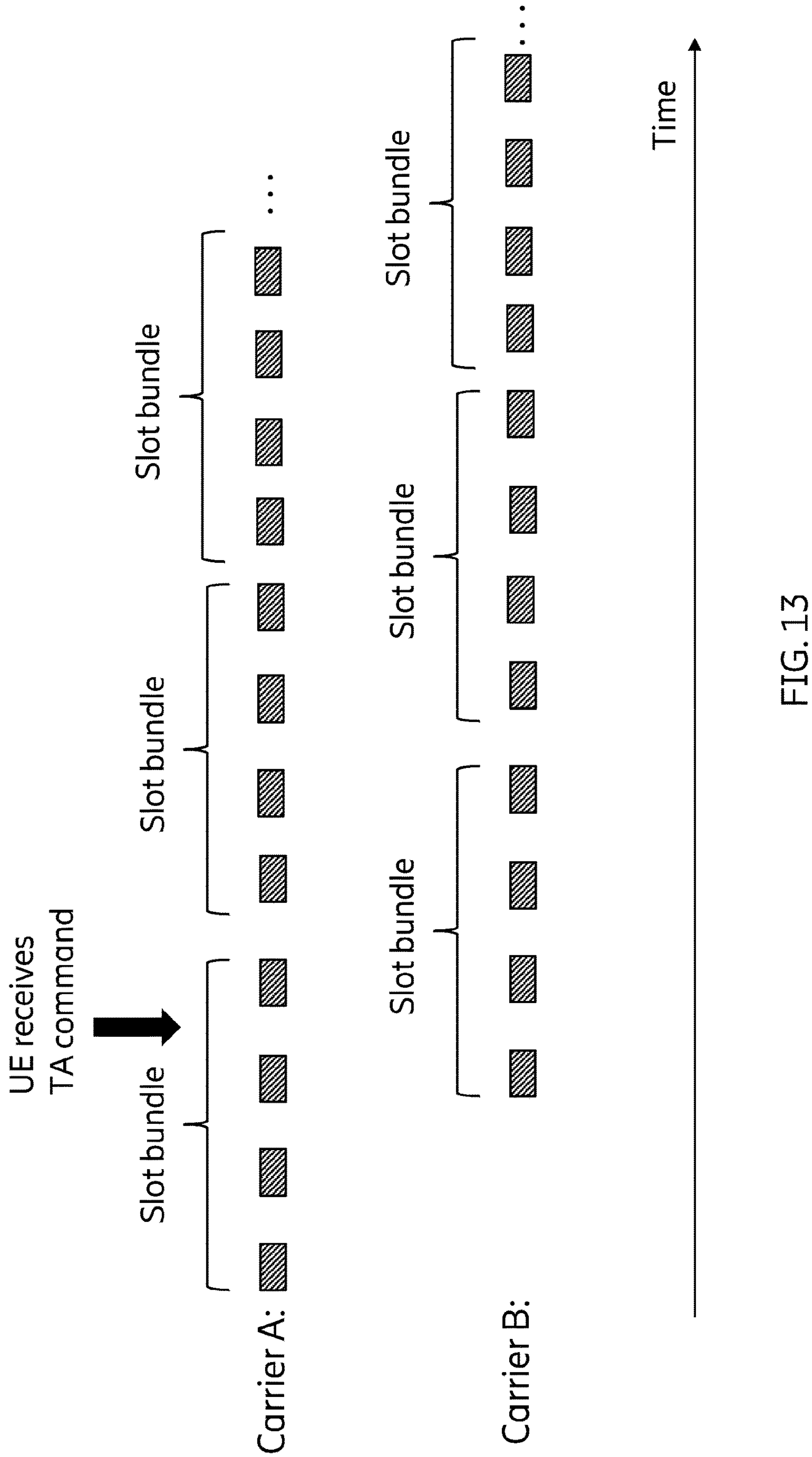
FIG. 13 schematically shows an exemplary situation with overlapping bundles on different carriers in a TAG, implying that there is no point in time where the TA update can be applied without disrupting joint estimation in the receiver.

Embodiment 4-1: In case one TAG has multiple serving cells, apply the TA update at different points in time for the different serving cells outside of the slot bundle boundaries in the different serving cells. Or, if there are multiple carriers in a TAG, the UE may apply the TA update at different points in time for the different carriers depending on the slot bundle boundaries on the different carriers. Note that if the slot bundles on different carriers do not have boundaries coinciding in time, just requiring the UE not to apply a timing update during a slot bundle could otherwise lead to the TA application being postponed for a very long time, see FIG. 13. FIG. 13 schematically shows an exemplary situation with overlapping bundles on different carriers in a TAG, implying that there is no point in time where the TA update can be applied without disrupting joint estimation in the receiver. In this case it could, for example, be specified or signaled that the UE should apply the update in between bundles on each carrier separately (thus for a period of time use different TA on different carriers), or it could be specified or signaled that the UE should apply the update in between bundles on one specific carrier and at the same time on the other carriers, thus preventing efficient joint channel estimation in one slot bundle on the other carriers.

In a sub-embodiment of embodiment 4-1, when a new TA is applied at different time points on different carriers of a TAG, the TA timer of the TAG should be started/restarted in one or more of the following methods:

- The time to start or restart the timer is predetermined
  - E.g., Started/restarted after the end last TA update or
    - Started/restarted after the first TA update of a TAG
- The time to start or restart the timer is configured by network, e.g., in RRC, MAC or DCI.

In another sub-embodiment of embodiment 4-1, different TA timers are introduced for different serving cells applying a new TA at different time points for one TAG.

Embodiment 4-2: In an alternative embodiment where multiple carriers are configured within a TAG, a UE transmits with a single TA for all carriers within the TAG and is configured such that the slot bundle occurs in the same slots on all carriers in the TAG. Because the slot bundle is the same on all carriers of the TAG, if a TA update is outside of the slot bundle on one carrier, it will be outside on all carriers, and therefore avoid the conflict illustrated in FIG. 13 in embodiment 4-1. Generally, then, according to this embodiment, the UE is configured such that slots to be bundled occur at the same time on all carriers that are in a TAG.

Embodiment 5: It's still up to following factors to determine whether a TA should be applied for the PUSCH transmission in a set of slots, wherein the set of slots can be a set of PUSCH repetitions or a single TB transmission over multiple slots or a combination of both cases. And UEs will not expect the slots with different TA values applied are treated as a bundle for joint channel estimation.

- time alignment timer
- the TA application time requirement since a TAC is received If the UE receives a TAC to be applied in a set of bundled slots, and the timer is running, then the UE is not required to maintain relative phase among slots of the bundle, and the UE applies the TAC on a portion of the bundled slots.

Generally, then this embodiment applies the TA still based on legacy behaviors, but the UE will not expect the slots with different TA values applied can be used for joint channel estimation, and the UE is not required to maintain relative phase among bundled slots.

Embodiment 6: The gNB can choose to apply (or not apply) joint channel estimation on a PUSCH bundle when a timing adjustment command (TAC) that would apply to one or more of the slots in the PUSCH bundle is not successfully decoded. For example, when a new TAC is transmitted from gNB but the UE fails to decode the PDSCH carrying the TAC, UE will not be able to apply a new TA adjusted by the new TAC not successfully received. The UE not applying the new TA can be known by the gNB as it doesn't receive ACK for PDSCH. One or more methods can be applied by the gNB:

- The gNB will not do joint channel estimation on a set of slots over which different TA values is assumed to be applied due to the new TAC is not correctly received and not applied by the UE.
- The gNB knows the UE doesn't apply TA adjustment and can do joint channel estimation on a set of slots before and after the time when TA adjustment is supposed to be applied.

For example, in a FDD network a UE is scheduled to transmit PUSCH over consecutive slots, which are divided into two bundles/time-domain windows. The slots in a bundle are for joint channel estimation. Slots in different bundles are not supposed to be jointly estimated. The gNB sends TAC to indicate to the UE to apply a new TA at the beginning of the second bundle. If the UE doesn't receive/decode the TAC, the UE doesn't send ACK for PDSCH, and the UE keeps the same TA across the slots in two bundles. The gNB can do joint channel estimation over the slots in two bundles as if TAC is not sent or do joint channel estimation only over slots in one bundle.

Embodiment 7: For TBoMS transmission, the same TA is applied for one TB transmission over multiple slots, but different TAs can be allowed for the repetitions of a TB transmitted over multiple slots. That is, TA can be updated on a repetition of TBoMS but not within slots of a single TBoMS transmission.

Embodiment 8: Timing corrections determined by the UE from errors in downlink timing are deferred until after bundled slots. For example, the UE applies a new TA within a bundle if it was signaled by the gNB, but not allowed to apply the new TA within a bundle if it is due to detected errors in DL timing. In one sub-embodiment, if the DL timing error is sufficiently small, for example no larger than Tp or Tq defined in 3GPP TS 38.133 rev. 17.0.0 Table 7.1.2.1-1, a prior value of timing advance is used during the bundle, and DL timing corrections are used for transmissions after the bundle. If there is both a signaled TA update and a TA update caused by detected downlink timing errors that are supposed to be (or could be) applied simultaneously, the UE should apply only the signaled part.

Embodiment 9: In some embodiments, the signaling of a TA update (TA message) from the gNB to the UE includes an indication of when the TA should be applied. The indication could, e.g., be an indication of the earliest time at which the TA should be applied, or it could just be a binary indication (e.g. a single bit) that indicates whether the TA update should be applied as soon as possible (e.g. according to Rel-15/16 rules) or only after the end of any bundle with ongoing transmission at the time when the update should have been made according to Rel-15/16 rules. The signaling could also or alternatively be used to determine to which extent preconfigured/predetermined thresholds are to be respected or not.

Generally, then, some embodiments herein exploit rules for when a TA update should or should not be applied, in particular rules for when the update should be applied at the point in time prescribed by Rel-15/16 of NR and when not.

In view of the modifications and variations above, some embodiments herein include those enumerated below.

1. (TA that falls within a slot bundle is applied if a particular channel is not configured for bundling or if the TA is small) A method in a UE of adjusting the transmission timing of physical channels according to a requirement to maintain relative phase among transmissions at different times, comprising
   a. Receiving signaling instructing the UE to maintain relative phase among a set of transmissions at predetermined instants in time
   b. Receiving a timing advance command that is to be used for transmission starting at a time instant
   c. If the time instant is during one or more of the predetermined instants in time, transmitting a first physical channel at the predetermined time instants according to the timing advance command and maintaining the relative phase among the transmissions, if at least one of the following conditions is met:
      i. If the UE receives signaling configuring the UE to maintain relative phase for a second physical channel, but not the first physical channel, or
      ii. If the timing advance command adjusts the timing less than a first predetermined threshold
   d. If the time instant is not during one or more of the predetermined instants in time, transmitting the first physical channel at the predetermined time instants according to the timing advance command and maintaining the relative phase among the transmissions.
2. (If a particular channel is configured for bundling, use the current TA for the slot bundle, and defer TA commands until after the slot bundle) A method in a UE of adjusting the transmission timing of physical channels according to a requirement to maintain relative phase among transmissions at different times, comprising
   a. Receiving signaling instructing the UE to maintain relative phase among a set of transmissions at predetermined instants in time, wherein the signaling configures the UE to maintain relative phase for a first physical channel, but not a second physical channel.
   b. Receiving a timing advance command that is to be used for transmission starting at a time instant
   c. If the time instant is during one or more of the predetermined instants in time, transmitting a first physical channel at the predetermined time instants using a prior value of timing advance and maintaining the relative phase among the transmissions
   d. Transmitting the first physical channel according to the timing advance command at time instants after the predetermined set of time instants.
3. (Carriers in a TAG have the same slot bundling times) A method in a UE of adjusting the transmission timing of physical channels according to a requirement to maintain relative phase among transmissions at different times, comprising
   a. Receiving signaling instructing the UE to maintain relative phase among a set of transmissions at predetermined instants in time
   b. Receiving a timing advance command that is to be used for transmission starting at a time instant
   c. Receiving signaling configuring the UE to transmit on a plurality of carriers, each within a same timing advance group (TAG), wherein
      i. the predetermined instants in time are constrained to be the same for all carriers in the TAG; and
   d. Transmitting using the same value of timing advance for all carriers in the TAG.
4. (TA is deferred according to the slot bundling times in each carrier) The method of 3, wherein
   a. The UE is configured to transmit on a plurality of carriers, each within a same timing advance group (TAG), and
   b. The predetermined instants in time are different between at least two carriers in the TAG, and further comprising
   c. If the time instant is during one or more of the predetermined instants in time on a carrier in the TAG, transmitting the first physical channel on the carrier in the TAG at the predetermined time instants using a prior value of timing advance and maintaining the relative phase among the transmissions; and
   d. Transmitting the first physical channel according to the timing advance command at time instants after the predetermined set of time instants.

5. (TA is adjusted between TBoMS transmissions) The method of 3, wherein
   a. each of the predetermined time instants is a slot, and further comprising
   b. If the time instant is during one or more of the predetermined instants in time, transmitting a same transport block on the first physical channel at the predetermined time instants and using a prior value of timing advance; and
   c. repeating the transmissions of the first physical channel at a second set of time instants, wherein the repeated transmissions are according to the timing advance command.
6. (UE applies timing error corrections from DL measurements to TA after, and not during, a slot bundle, where the corrections are not too large) A method in a UE of adjusting the transmission timing of physical channels according to a requirement to maintain relative phase among transmissions at different times, comprising
   a. Receiving signaling instructing the UE to maintain relative phase among a set of transmissions at predetermined instants in time
   b. Determining a transmission timing error from measurements of downlink signals
   c. If the transmission timing error is less than a predetermined value,
      i. transmitting a physical channel using a prior value of transmission timing within the predetermined instants in time, and
      ii. transmitting the physical channel using a transmission timing adjustment to correct for the transmission timing error after the predetermined instants in time.

Figure 14:
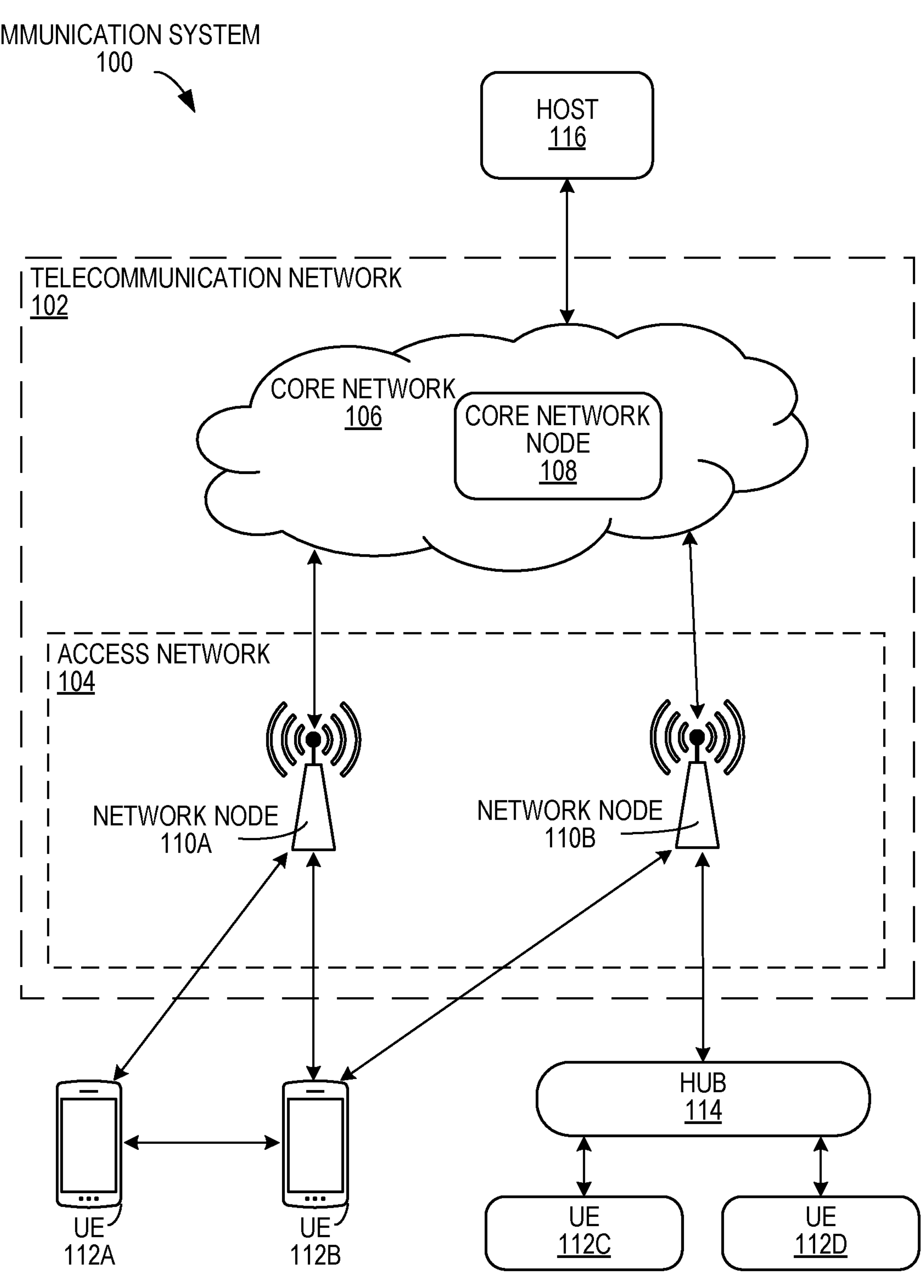
FIG. 14 is a block diagram of a communication system according to some embodiments.

FIG. 14 shows an example of a communication system 100 in accordance with some embodiments.

In the example, the communication system 100 includes a telecommunication network 102 that includes an access network 104, such as a radio access network (RAN), and a core network 106, which includes one or more core network nodes 108. The access network 104 includes one or more access network nodes, such as network nodes 110*a* and 110*b* (one or more of which may be generally referred to as network nodes 110), or any other similar 3rd Generation Partnership Project (3GPP) access node or non-3GPP access point. The network nodes 110 facilitate direct or indirect connection of user equipment (UE), such as by connecting UEs 112*a*, 112*b*, 112*c*, and 112*d* (one or more of which may be generally referred to as UEs 112) to the core network 106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 100 may include any number of wired or wireless networks, network nodes, UEs, and/or any other components or systems that may facilitate or participate in the communication of data and/or signals whether via wired or wireless connections. The communication system 100 may include and/or interface with any type of communication, telecommunication, data, cellular, radio network, and/or other similar type of system.

The UEs 112 may be any of a wide variety of communication devices, including wireless devices arranged, configured, and/or operable to communicate wirelessly with the network nodes 110 and other communication devices. Similarly, the network nodes 110 are arranged, capable, configured, and/or operable to communicate directly or indirectly with the UEs 112 and/or with other network nodes or equipment in the telecommunication network 102 to enable and/or provide network access, such as wireless network access, and/or to perform other functions, such as administration in the telecommunication network 102.

In the depicted example, the core network 106 connects the network nodes 110 to one or more hosts, such as host 116. These connections may be direct or indirect via one or more intermediary networks or devices. In other examples, network nodes may be directly coupled to hosts. The core network 106 includes one more core network nodes (e.g., core network node 108) that are structured with hardware and software components. Features of these components may be substantially similar to those described with respect to the UEs, network nodes, and/or hosts, such that the descriptions thereof are generally applicable to the corresponding components of the core network node 108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 116 may be under the ownership or control of a service provider other than an operator or provider of the access network 104 and/or the telecommunication network 102, and may be operated by the service provider or on behalf of the service provider. The host 116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 100 of FIG. 14 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 102 is a cellular network that implements 3GPP standardized features. Accordingly, the telecommunications network 102 may support network slicing to provide different logical networks to different devices that are connected to the telecommunication network 102. For example, the telecommunications network 102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 112 are configured to transmit and/or receive information without direct human interaction. For instance, a UE may be designed to transmit information to the access network 104 on a predetermined schedule, when triggered by an internal or external event, or in response to requests from the access network 104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio—Dual Connectivity (EN-DC).

In the example, the hub 114 communicates with the access network 104 to facilitate indirect communication between one or more UEs (e.g., UE 112*c* and/or 112*d*) and network nodes (e.g., network node 110*b*). In some examples, the hub 114 may be a controller, router, content source and analytics, or any of the other communication devices described herein regarding UEs. For example, the hub 114 may be a broadband router enabling access to the core network 106 for the UEs. As another example, the hub 114 may be a controller that sends commands or instructions to one or more actuators in the UEs. Commands or instructions may be received from the UEs, network nodes 110, or by executable code, script, process, or other instructions in the hub 114. As another example, the hub 114 may be a data collector that acts as temporary storage for UE data and, in some embodiments, may perform analysis or other processing of the data. As another example, the hub 114 may be a content source. For example, for a UE that is a VR headset, display, loudspeaker or other media delivery device, the hub 114 may retrieve VR assets, video, audio, or other media or data related to sensory information via a network node, which the hub 114 then provides to the UE either directly, after performing local processing, and/or after adding additional local content. In still another example, the hub 114 acts as a proxy server or orchestrator for the UEs, in particular in if one or more of the UEs are low energy IoT devices.

The hub 114 may have a constant/persistent or intermittent connection to the network node 110*b*. The hub 114 may also allow for a different communication scheme and/or schedule between the hub 114 and UEs (e.g., UE 112*c* and/or 112*d*), and between the hub 114 and the core network 106. In other examples, the hub 114 is connected to the core network 106 and/or one or more UEs via a wired connection. Moreover, the hub 114 may be configured to connect to an M2M service provider over the access network 104 and/or to another UE over a direct connection. In some scenarios, UEs may establish a wireless connection with the network nodes 110 while still connected via the hub 114 via a wired or wireless connection. In some embodiments, the hub 114 may be a dedicated hub—that is, a hub whose primary function is to route communications to/from the UEs from/to the network node 110*b*. In other embodiments, the hub 114 may be a non-dedicated hub—that is, a device which is capable of operating to route communications between the UEs and network node 110*b*, but which is additionally capable of operating as a communication start and/or end point for certain data channels.

Figure 15:
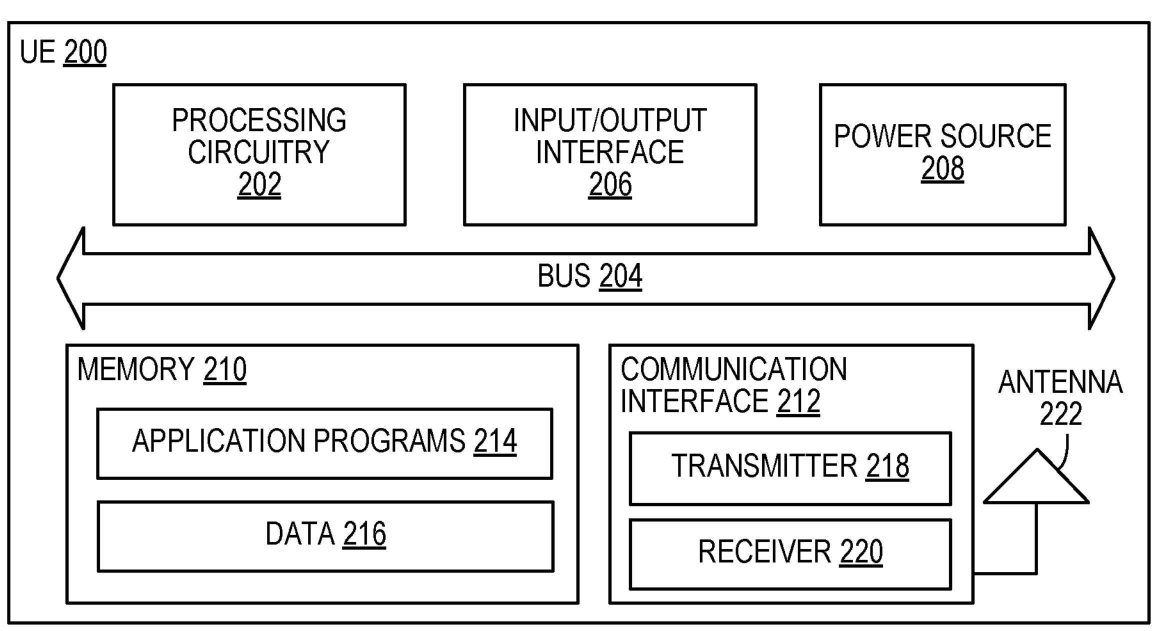
FIG. 15 is a block diagram of a user equipment according to some embodiments.

FIG. 15 shows a UE 200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 200 includes processing circuitry 202 that is operatively coupled via a bus 204 to an input/output interface 206, a power source 208, a memory 210, a communication interface 212, and/or any other component, or any combination thereof. Certain UEs may utilize all or a subset of the components shown in FIG. 15. The level of integration between the components may vary from one UE to another UE. Further, certain UEs may contain multiple instances of a component, such as multiple processors, memories, transceivers, transmitters, receivers, etc.

The processing circuitry 202 is configured to process instructions and data and may be configured to implement any sequential state machine operative to execute instructions stored as machine-readable computer programs in the memory 210. The processing circuitry 202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 202 may include multiple central processing units (CPUs).

In the example, the input/output interface 206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 208 is structured as a battery or battery pack. Other types of power sources, such as an external power source (e.g., an electricity outlet), photovoltaic device, or power cell, may be used. The power source 208 may further include power circuitry for delivering power from the power source 208 itself, and/or an external power source, to the various parts of the UE 200 via input circuitry or an interface such as an electrical power cable. Delivering power may be, for example, for charging of the power source 208. Power circuitry may perform any formatting, converting, or other modification to the power from the power source 208 to make the power suitable for the respective components of the UE 200 to which power is supplied.

The memory 210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 210 includes one or more application programs 214, such as an operating system, web browser application, a widget, gadget engine, or other application, and corresponding data 216. The memory 210 may store, for use by the UE 200, any of a variety of various operating systems or combinations of operating systems.

The memory 210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 210 may allow the UE 200 to access instructions, application programs and the like, stored on transitory or non-transitory memory media, to off-load data, or to upload data. An article of manufacture, such as one utilizing a communication system may be tangibly embodied as or in the memory 210, which may be or comprise a device-readable storage medium.

The processing circuitry 202 may be configured to communicate with an access network or other network using the communication interface 212. The communication interface 212 may comprise one or more communication subsystems and may include or be communicatively coupled to an antenna 222. The communication interface 212 may include one or more transceivers used to communicate, such as by communicating with one or more remote transceivers of another device capable of wireless communication (e.g., another UE or a network node in an access network). Each transceiver may include a transmitter 218 and/or a receiver 220 appropriate to provide network communications (e.g., optical, electrical, frequency allocations, and so forth). Moreover, the transmitter 218 and receiver 220 may be coupled to one or more antennas (e.g., antenna 222) and may share circuit components, software or firmware, or alternatively be implemented separately.

In the illustrated embodiment, communication functions of the communication interface 212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 200 shown in FIG. 15.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 16:
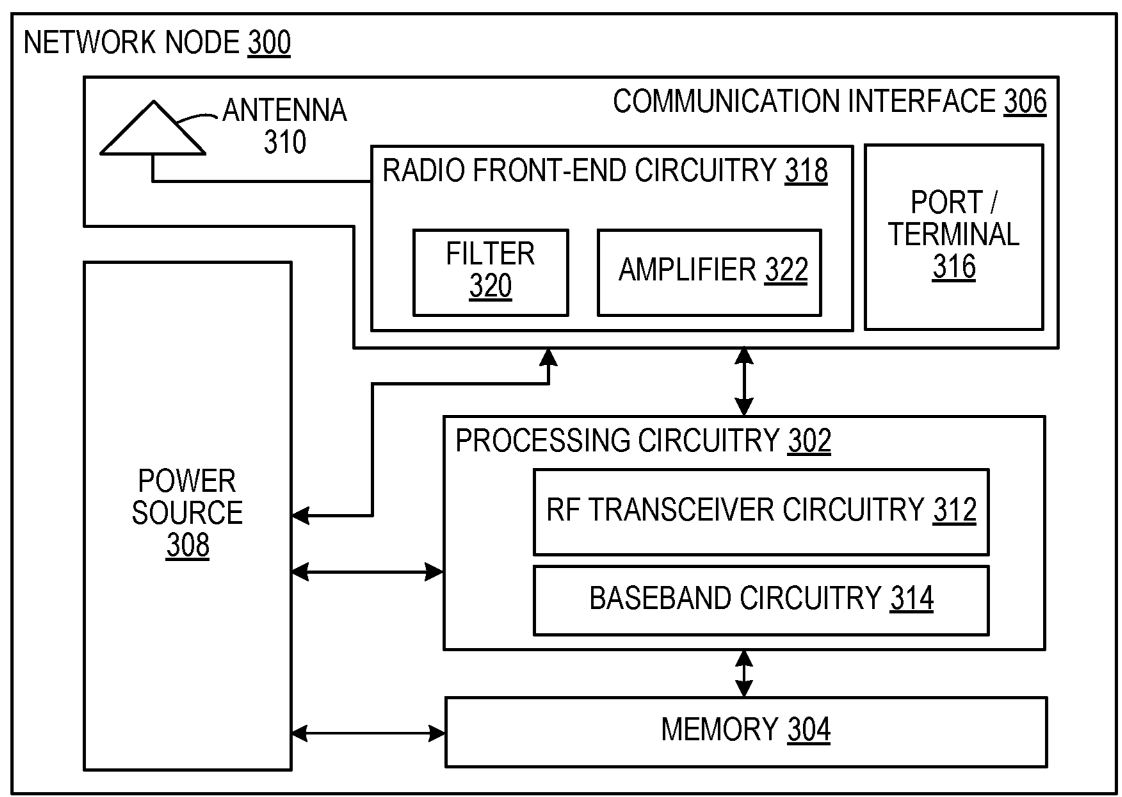
FIG. 16 is a block diagram of a network node according to some embodiments.

FIG. 16 shows a network node 300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 300 includes a processing circuitry 302, a memory 304, a communication interface 306, and a power source 308. The network node 300 may be composed of multiple physically separate components (e.g., a NodeB component and a RNC component, or a BTS component and a BSC component, etc.), which may each have their own respective components. In certain scenarios in which the network node 300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 300 may be configured to support multiple radio access technologies (RATs). In such embodiments, some components may be duplicated (e.g., separate memory 304 for different RATs) and some components may be reused (e.g., a same antenna 310 may be shared by different RATs). The network node 300 may also include multiple sets of the various illustrated components for different wireless technologies integrated into network node 300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 300.

The processing circuitry 302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 300 components, such as the memory 304, to provide network node 300 functionality.

In some embodiments, the processing circuitry 302 includes a system on a chip (SOC). In some embodiments, the processing circuitry 302 includes one or more of radio frequency (RF) transceiver circuitry 312 and baseband processing circuitry 314. In some embodiments, the radio frequency (RF) transceiver circuitry 312 and the baseband processing circuitry 314 may be on separate chips (or sets of chips), boards, or units, such as radio units and digital units. In alternative embodiments, part or all of RF transceiver circuitry 312 and baseband processing circuitry 314 may be on the same chip or set of chips, boards, or units.

The memory 304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 302. The memory 304 may store any suitable instructions, data, or information, including a computer program, software, an application including one or more of logic, rules, code, tables, and/or other instructions capable of being executed by the processing circuitry 302 and utilized by the network node 300. The memory 304 may be used to store any calculations made by the processing circuitry 302 and/or any data received via the communication interface 306. In some embodiments, the processing circuitry 302 and memory 304 is integrated.

The communication interface 306 is used in wired or wireless communication of signaling and/or data between a network node, access network, and/or UE. As illustrated, the communication interface 306 comprises port(s)/terminal(s) 316 to send and receive data, for example to and from a network over a wired connection. The communication interface 306 also includes radio front-end circuitry 318 that may be coupled to, or in certain embodiments a part of, the antenna 310. Radio front-end circuitry 318 comprises filters 320 and amplifiers 322. The radio front-end circuitry 318 may be connected to an antenna 310 and processing circuitry 302. The radio front-end circuitry may be configured to condition signals communicated between antenna 310 and processing circuitry 302. The radio front-end circuitry 318 may receive digital data that is to be sent out to other network nodes or UEs via a wireless connection. The radio front-end circuitry 318 may convert the digital data into a radio signal having the appropriate channel and bandwidth parameters using a combination of filters 320 and/or amplifiers 322. The radio signal may then be transmitted via the antenna 310. Similarly, when receiving data, the antenna 310 may collect radio signals which are then converted into digital data by the radio front-end circuitry 318. The digital data may be passed to the processing circuitry 302. In other embodiments, the communication interface may comprise different components and/or different combinations of components.

In certain alternative embodiments, the network node 300 does not include separate radio front-end circuitry 318, instead, the processing circuitry 302 includes radio front-end circuitry and is connected to the antenna 310. Similarly, in some embodiments, all or some of the RF transceiver circuitry 312 is part of the communication interface 306. In still other embodiments, the communication interface 306 includes one or more ports or terminals 316, the radio front-end circuitry 318, and the RF transceiver circuitry 312, as part of a radio unit (not shown), and the communication interface 306 communicates with the baseband processing circuitry 314, which is part of a digital unit (not shown).

The antenna 310 may include one or more antennas, or antenna arrays, configured to send and/or receive wireless signals. The antenna 310 may be coupled to the radio front-end circuitry 318 and may be any type of antenna capable of transmitting and receiving data and/or signals wirelessly. In certain embodiments, the antenna 310 is separate from the network node 300 and connectable to the network node 300 through an interface or port.

The antenna 310, communication interface 306, and/or the processing circuitry 302 may be configured to perform any receiving operations and/or certain obtaining operations described herein as being performed by the network node. Any information, data and/or signals may be received from a UE, another network node and/or any other network equipment. Similarly, the antenna 310, the communication interface 306, and/or the processing circuitry 302 may be configured to perform any transmitting operations described herein as being performed by the network node. Any information, data and/or signals may be transmitted to a UE, another network node and/or any other network equipment.

The power source 308 provides power to the various components of network node 300 in a form suitable for the respective components (e.g., at a voltage and current level needed for each respective component). The power source 308 may further comprise, or be coupled to, power management circuitry to supply the components of the network node 300 with power for performing the functionality described herein. For example, the network node 300 may be connectable to an external power source (e.g., the power grid, an electricity outlet) via an input circuitry or interface such as an electrical cable, whereby the external power source supplies power to power circuitry of the power source 308. As a further example, the power source 308 may comprise a source of power in the form of a battery or battery pack which is connected to, or integrated in, power circuitry. The battery may provide backup power should the external power source fail.

Embodiments of the network node 300 may include additional components beyond those shown in FIG. 3 for providing certain aspects of the network node's functionality, including any of the functionality described herein and/or any functionality necessary to support the subject matter described herein. For example, the network node 300 may include user interface equipment to allow input of information into the network node 300 and to allow output of information from the network node 300. This may allow a user to perform diagnostic, maintenance, repair, and other administrative functions for the network node 300.

Figure 17:
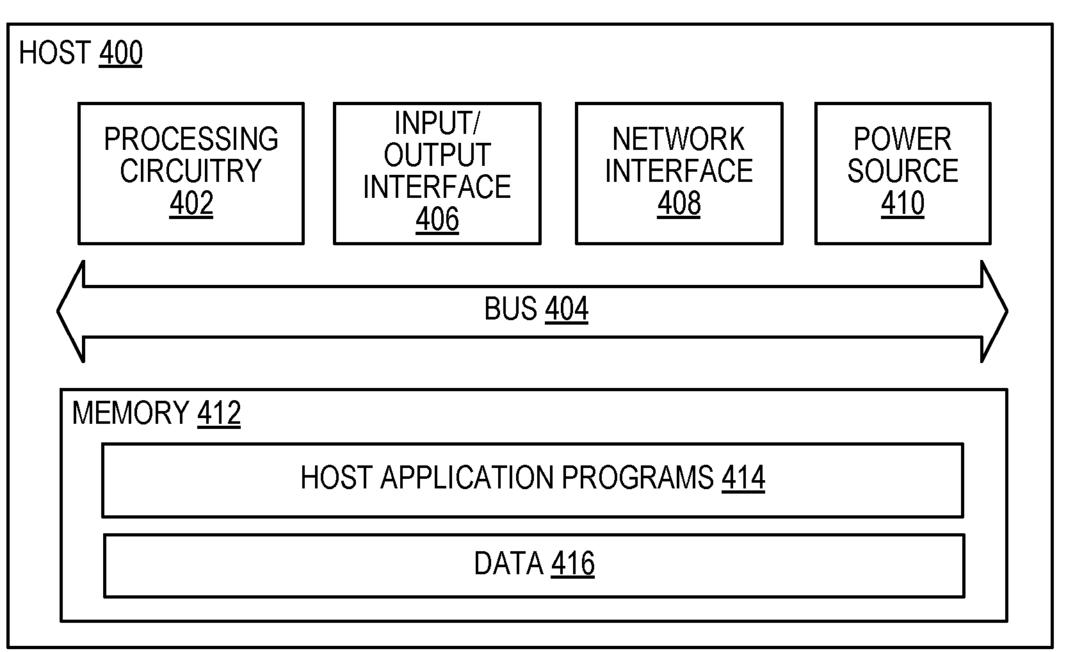
FIG. 17 is a block diagram of a host according to some embodiments.

FIG. 17 is a block diagram of a host 400, which may be an embodiment of the host 116 of FIG. 14, in accordance with various aspects described herein. As used herein, the host 400 may be or comprise various combinations hardware and/or software, including a standalone server, a blade server, a cloud-implemented server, a distributed server, a virtual machine, container, or processing resources in a server farm. The host 400 may provide one or more services to one or more UEs.

The host 400 includes processing circuitry 402 that is operatively coupled via a bus 404 to an input/output interface 406, a network interface 408, a power source 410, and a memory 412. Other components may be included in other embodiments. Features of these components may be substantially similar to those described with respect to the devices of previous figures, such as FIGS. 15 and 16, such that the descriptions thereof are generally applicable to the corresponding components of host 400.

The memory 412 may include one or more computer programs including one or more host application programs 414 and data 416, which may include user data, e.g., data generated by a UE for the host 400 or data generated by the host 400 for a UE. Embodiments of the host 400 may utilize only a subset or all of the components shown. The host application programs 414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 414 may also provide for user authentication and licensing checks and may periodically report health, routes, and content availability to a central node, such as a device in or on the edge of a core network. Accordingly, the host 400 may select and/or indicate a different host for over-the-top services for a UE. The host application programs 414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 18:
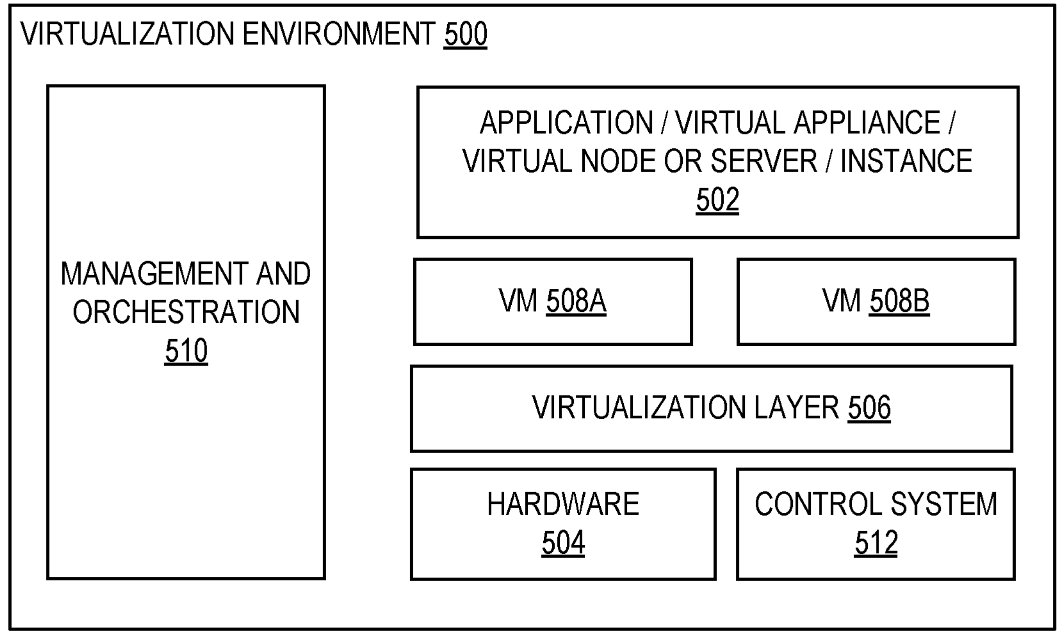
FIG. 18 is a block diagram of a virtualized environment according to some embodiments.

FIG. 18 is a block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 506 (also referred to as hypervisors or virtual machine monitors (VMMs)), provide VMs 508*a* and 508*b* (one or more of which may be generally referred to as VMs 508), and/or perform any of the functions, features and/or benefits described in relation with some embodiments described herein. The virtualization layer 506 may present a virtual operating platform that appears like networking hardware to the VMs 508.

The VMs 508 comprise virtual processing, virtual memory, virtual networking or interface and virtual storage, and may be run by a corresponding virtualization layer 506. Different embodiments of the instance of a virtual appliance 502 may be implemented on one or more of VMs 508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 508 may be a software implementation of a physical machine that runs programs as if they were executing on a physical, non-virtualized machine. Each of the VMs 508, and that part of hardware 504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 508 on top of the hardware 504 and corresponds to the application 502.

Hardware 504 may be implemented in a standalone network node with generic or specific components. Hardware 504 may implement some functions via virtualization. Alternatively, hardware 504 may be part of a larger cluster of hardware (e.g. such as in a data center or CPE) where many hardware nodes work together and are managed via management and orchestration 510, which, among others, oversees lifecycle management of applications 502. In some embodiments, hardware 504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 512 which may alternatively be used for communication between hardware nodes and radio units.

Figure 19:
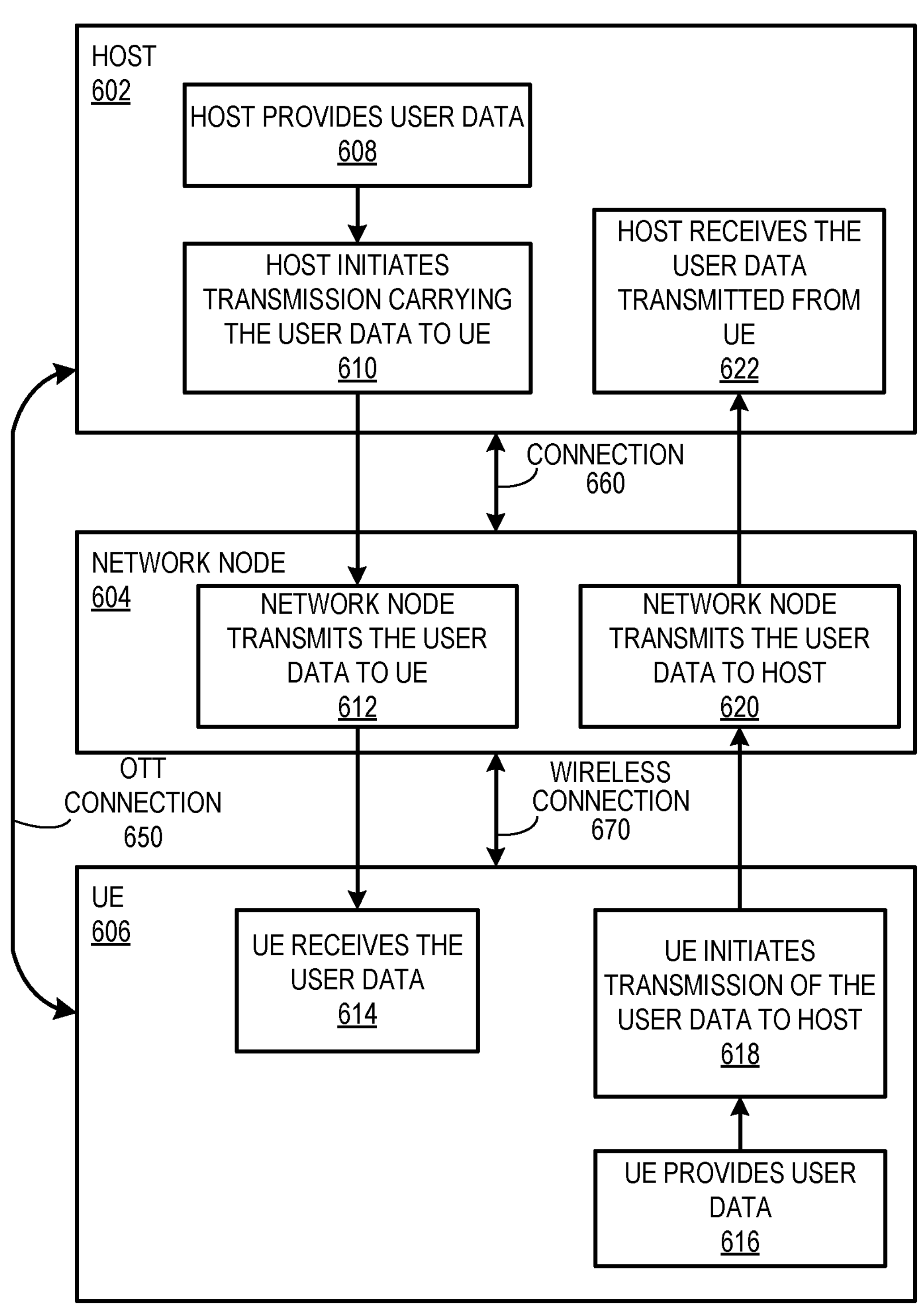
FIG. 19 is a communication diagram of a host communicating via a network node with a UE over a partially wireless connection in accordance with some embodiments.

FIG. 19 shows a communication diagram of a host 602 communicating via a network node 604 with a UE 606 over a partially wireless connection in accordance with some embodiments. Example implementations, in accordance with various embodiments, of the UE (such as a UE 112*a* of FIG. 14 and/or UE 200 of FIG. 15), network node (such as network node 110*a* of FIG. 14 and/or network node 300 of FIG. 16), and host (such as host 116 of FIG. 14 and/or host 400 of FIG. 17) discussed in the preceding paragraphs will now be described with reference to FIG. 19.

Like host 400, embodiments of host 602 include hardware, such as a communication interface, processing circuitry, and memory. The host 602 also includes software, which is stored in or accessible by the host 602 and executable by the processing circuitry. The software includes a host application that may be operable to provide a service to a remote user, such as the UE 606 connecting via an over-the-top (OTT) connection 650 extending between the UE 606 and host 602. In providing the service to the remote user, a host application may provide user data which is transmitted using the OTT connection 650.

The network node 604 includes hardware enabling it to communicate with the host 602 and UE 606. The connection 660 may be direct or pass through a core network (like core network 106 of FIG. 14) and/or one or more other intermediate networks, such as one or more public, private, or hosted networks. For example, an intermediate network may be a backbone network or the Internet.

The UE 606 includes hardware and software, which is stored in or accessible by UE 606 and executable by the UE's processing circuitry. The software includes a client application, such as a web browser or operator-specific "app" that may be operable to provide a service to a human or non-human user via UE 606 with the support of the host 602. In the host 602, an executing host application may communicate with the executing client application via the OTT connection 650 terminating at the UE 606 and host 602. In providing the service to the user, the UE's client application may receive request data from the host's host application and provide user data in response to the request data. The OTT connection 650 may transfer both the request data and the user data. The UE's client application may interact with the user to generate the user data that it provides to the host application through the OTT connection 650.

The OTT connection 650 may extend via a connection 660 between the host 602 and the network node 604 and via a wireless connection 670 between the network node 604 and the UE 606 to provide the connection between the host 602 and the UE 606. The connection 660 and wireless connection 670, over which the OTT connection 650 may be provided, have been drawn abstractly to illustrate the communication between the host 602 and the UE 606 via the network node 604, without explicit reference to any intermediary devices and the precise routing of messages via these devices.

As an example of transmitting data via the OTT connection 650, in step 608, the host 602 provides user data, which may be performed by executing a host application. In some embodiments, the user data is associated with a particular human user interacting with the UE 606. In other embodiments, the user data is associated with a UE 606 that shares data with the host 602 without explicit human interaction. In step 610, the host 602 initiates a transmission carrying the user data towards the UE 606. The host 602 may initiate the transmission responsive to a request transmitted by the UE 606. The request may be caused by human interaction with the UE 606 or by operation of the client application executing on the UE 606. The transmission may pass via the network node 604, in accordance with the teachings of the embodiments described throughout this disclosure. Accordingly, in step 612, the network node 604 transmits to the UE 606 the user data that was carried in the transmission that the host 602 initiated, in accordance with the teachings of the embodiments described throughout this disclosure. In step 614, the UE 606 receives the user data carried in the transmission, which may be performed by a client application executed on the UE 606 associated with the host application executed by the host 602.

In some examples, the UE 606 executes a client application which provides user data to the host 602. The user data may be provided in reaction or response to the data received from the host 602. Accordingly, in step 616, the UE 606 may provide user data, which may be performed by executing the client application. In providing the user data, the client application may further consider user input received from the user via an input/output interface of the UE 606. Regardless of the specific manner in which the user data was provided, the UE 606 initiates, in step 618, transmission of the user data towards the host 602 via the network node 604. In step 620, in accordance with the teachings of the embodiments described throughout this disclosure, the network node 604 receives user data from the UE 606 and initiates transmission of the received user data towards the host 602. In step 622, the host 602 receives the user data carried in the transmission initiated by the UE 606.

One or more of the various embodiments improve the performance of OTT services provided to the UE 606 using the OTT connection 650, in which the wireless connection 670 forms the last segment.

In an example scenario, factory status information may be collected and analyzed by the host 602. As another example, the host 602 may process audio and video data which may have been retrieved from a UE for use in creating maps. As another example, the host 602 may collect and analyze real-time data to assist in controlling vehicle congestion (e.g., controlling traffic lights). As another example, the host 602 may store surveillance video uploaded by a UE. As another example, the host 602 may store or control access to media content such as video, audio, VR or AR which it can broadcast, multicast or unicast to UEs. As other examples, the host 602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 650 between the host 602 and UE 606, in response to variations in the measurement results. The measurement procedure and/or the network functionality for reconfiguring the OTT connection may be implemented in software and hardware of the host 602 and/or UE 606. In some embodiments, sensors (not shown) may be deployed in or in association with other devices through which the OTT connection 650 passes; the sensors may participate in the measurement procedure by supplying values of the monitored quantities exemplified above, or supplying values of other physical quantities from which software may compute or estimate the monitored quantities. The reconfiguring of the OTT connection 650 may include message format, retransmission settings, preferred routing etc.; the reconfiguring need not directly alter the operation of the network node 604. Such procedures and functionalities may be known and practiced in the art. In certain embodiments, measurements may involve proprietary UE signaling that facilitates measurements of throughput, propagation times, latency and the like, by the host 602. The measurements may be implemented in that software causes messages to be transmitted, in particular empty or 'dummy' messages, using the OTT connection 650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

ENUMERATED EMBODIMENTS

Group A Embodiments

A1. A method performed by a wireless device, the method comprising:

obtaining a timing advance adjustment that comprises an adjustment to an uplink transmission timing of uplink transmissions on a carrier or bandwidth part, wherein the adjustment to the uplink transmission timing is to apply beginning at a nominal start time;

determining an uplink transmission timing of an uplink transmission that is to be performed on the carrier or bandwidth part at or after the nominal start time as part of, or during a window of time spanned by, a set of uplink transmissions that are restricted to having one or more of the same transmission parameters on the carrier or bandwidth part, wherein the uplink transmission timing is determined based on one or more rules that specify:

the uplink transmission timing of the uplink transmission is to be adjusted according to the timing advance adjustment if one or more first conditions are met; and the uplink transmission timing of the uplink transmission is not to be adjusted according to the timing advance adjustment if one or more second conditions are met; and performing the uplink transmission on the carrier or bandwidth part with the determined uplink transmission timing.

A2. The method of embodiment A1, wherein the one or more first conditions include a first condition that is met if the uplink transmission is to be performed during the window of time spanned by the set of uplink transmissions but is not performed as part of the set of uplink transmissions, and wherein the one or more second conditions include a second condition that is met if the uplink transmission is to be performed as part of the set of uplink transmissions.

A3. The method of any of embodiments A1-A2, wherein the window of time spanned by the set of uplink transmissions includes a bundle of time slots, wherein the uplink transmissions in the set are to be performed during respective ones of the time slots in the bundle.

A4. The method of embodiment A3, wherein the one or more first conditions include a first condition that is met if the uplink transmission is to be performed during the window of time spanned by the set of uplink transmissions but not during a time slot in the bundle, and wherein the one or more second conditions include a second condition that is met if the uplink transmission is to be performed during a time slot in the bundle.

A5. The method of any of embodiments A1-A4, wherein the one or more first conditions include a first condition that is met if the uplink transmission is to be performed on a first physical channel of the carrier or bandwidth part, and wherein the one or more second conditions include a second condition that is met if the uplink transmission is to be performed on a second physical channel of the carrier or bandwidth part.

A6. The method of embodiment A5, wherein uplink transmissions performed on the first physical channel are performed as part of the set of uplink transmissions, and wherein uplink transmissions performed on the second physical channel are not performed as part of the set of uplink transmissions.

A7. The method of any of embodiments A5-A6, further comprising selecting a transmit chain on which to perform the uplink transmission, based on the determined uplink transmission timing of the uplink transmission.

A8. The method of any of embodiments A1-A7, wherein the one or more first conditions include a first condition that is met if the uplink transmission is to be performed on a first transmit chain of the wireless device, and wherein the one or more second conditions include a second condition that is met if the uplink transmission is to be performed on a second transmit chain of the wireless device.

A9. The method of any of embodiments A1-A8, wherein the one or more first conditions include a first condition that is met if an amount by which the wireless device is to adjust the uplink transmission timing according to the timing advance adjustment is smaller than a threshold amount, and wherein the one or more second conditions include a second condition that is met if the amount by which the wireless device is to adjust the uplink transmission timing according to the timing advance adjustment is larger than the threshold amount.

A10. The method of any of embodiments A1-A8, wherein the one or more first conditions include a first condition that is met if an amount by which the wireless device is to adjust the uplink transmission timing according to the timing advance adjustment is larger than a threshold amount, and wherein the one or more second conditions include a second condition that is met if the amount by which the wireless device is to adjust the uplink transmission timing according to the timing advance adjustment is smaller than the threshold amount.

A11. The method of any of embodiments A1-A10, wherein the one or more first conditions include a first condition that is met if the wireless device is to increase advancement of the uplink transmission timing of uplink transmissions on the carrier or bandwidth, and wherein the one or more second conditions include a second condition that is met if the wireless device is to decrease advancement of the uplink transmission timing of uplink transmissions on the carrier or bandwidth.

A12. The method of any of embodiments A1-A11, wherein the one or more first conditions include a first condition that is met if the timing advance adjustment is obtained by receiving a timing advance command that indicates the timing advance adjustment, and wherein the one or more second conditions include a second condition that is met if the timing advance adjustment is not obtained by receiving a timing advance command that indicates the timing advance adjustment.

A13. The method of any of embodiments A1-A12, wherein the one or more first conditions include a first condition that is met if signaling from a wireless communication network indicates the uplink transmission timing of the uplink transmission is to be adjusted according to the timing advance adjustment, and wherein the one or more second conditions include a second condition that is met if no signaling from the wireless communication network indicates the uplink transmission timing of the uplink transmission is to be adjusted according to the timing advance adjustment.

A14. The method of any of embodiments A1-A13, wherein the set of uplink transmissions includes a set of Physical Uplink Shared Channel, PUSCH, transmissions.

A15. The method of any of embodiments A1-A14, wherein the one or more of the same transmission parameters comprise parameters that impact phase consistency of the uplink transmissions in the set.

A16. The method of any of embodiments A1-A15, wherein the one or more of the same transmission parameters comprise one or more of:
- a modulation order;
- a resource block, RB, allocation in terms of length and frequency position;
- a transmission power level; and
- an uplink beam.

A17. The method of any of embodiments A1-A16, wherein the set of uplink transmissions are restricted to having one or more of the same transmission parameters so that there is phase consistency among the uplink transmissions.

A18. The method of any of embodiments A1-A16, further comprising maintaining relative phase among uplink transmissions in the set, in response to or as a result of the restriction of having one or more of the same transmission parameters.

A19. The method of any of embodiments A1-A18, wherein the uplink transmissions in the set are associated with demodulation reference signals, DMRS, in a bundle.

A20. The method of any of embodiments A1-A19, further comprising performing the uplink transmission on a second carrier or bandwidth part in a second set of uplink transmissions with the determined uplink transmission timing, wherein the set second of uplink transmissions are constrained to coincide in time with the first set of uplink transmissions.

A21. The method of any of embodiments A1-A20, wherein said obtaining comprises receiving a timing advance command that commands the wireless device to perform the adjustment to the uplink transmission timing of uplink transmissions on a carrier or bandwidth part.

A22. The method of embodiment A21, wherein the nominal start time is a beginning of an uplink slot that is a certain number of uplink slots after an uplink slot on which the timing advance command was received.

AA1. A method performed by a wireless device, the method comprising:
- obtaining a timing advance adjustment that comprises an adjustment to an uplink transmission timing of uplink transmissions on a carrier or bandwidth part, wherein the adjustment to the uplink transmission timing is to apply beginning at a nominal start time; and
- puncturing an uplink transmission that is to be performed on the carrier or bandwidth part at or after the nominal start time as part of, or during a window of time spanned by, a set of uplink transmissions that are restricted to having one or more of the same transmission parameters on the carrier or bandwidth part, wherein the uplink transmission is punctured to an extent that is determined based on an amount of the adjustment to the uplink transmission timing.

AA2. The method of embodiment AA1, wherein the uplink transmission is performed with an uplink transmission timing that is not adjusted according to the timing advance adjustment.

AAA1. A method performed by a wireless device, the method comprising:
- receiving a timing advance command that commands the wireless device to perform an adjustment to an uplink transmission timing of uplink transmissions on a carrier or bandwidth part;
- receiving signaling that indicates when the wireless device is to apply the adjustment; and
- applying the adjustment when the received signaling indicates the wireless device is to apply the adjustment.

AAA2. The method of embodiment AAA1, wherein the signaling indicates an earliest time at which the adjustment is to be applied.

AAA3. The method of embodiment AAA1, wherein the signaling indicates whether the adjustment is to be applied:
- at a beginning of an uplink slot that is a certain number of uplink slots after an uplink slot on which the timing advance command was received; or
- after or at the end of a window of time spanned by a set of uplink transmissions that are restricted to having one or more of the same transmission parameters on the carrier or bandwidth part.

AAA4. The method of embodiment AAA1, wherein the signaling indicates whether or not the wireless device is to respect a threshold that governs or impacts when the wireless device is to apply the adjustment.

AAA5. The method of any of embodiments AAA1-AAA4, wherein the signaling indicates whether the wireless device is to apply the adjustment at the same time or at different times on each carrier within the same timing advance group.

AAAA1. A method performed by a wireless device, the method comprising:
- obtaining a timing advance adjustment that comprises an adjustment to an uplink transmission timing of uplink transmissions on a carrier or bandwidth part; and
- deciding whether or not to apply the adjustment within a window of time spanned by a set of uplink transmissions that are restricted to having one or more of the same transmission parameters on the carrier or bandwidth part; and
- applying or not applying the adjustment within the window of time according to said deciding.

AAAA2. The method of embodiment AAAA1, wherein said deciding is based on whether the timing advance adjustment is commanded by a received timing advance command or due to detected errors in downlink timing.

AAAA3. The method of embodiment AAAA2, wherein said deciding comprises deciding to apply the adjustment within the window of time if the timing advance adjustment is commanded by a received timing advance command and deciding to not apply the adjustment within the window of time if the timing advance adjustment is due to detected errors in downlink timing.

AAAA4. The method of any of embodiments AAAA1-AAAA3, wherein said deciding is based on a size of and/or a direction of the adjustment.

AAAAA1. A method performed by a wireless device, the method comprising:
- receiving signaling that configures sets of uplink transmissions on respective carriers in a timing advance group to span the same window of time, wherein the uplink transmissions in each set is restricted to having one or more of the same transmission parameters.

AAAAA2. The method of embodiment AAAAA1, wherein each set of uplink transmissions is a set of Physical Uplink Shared Channel, PUSCH, transmissions.

AAAAA3. The method of any of embodiments AAAAA1-AAAAA2, wherein the one or more of the same transmission parameters comprise parameters that impact phase consistency of the uplink transmissions in a set.

AAAAA4. The method of any of embodiments AAAAA1-AAAAA3, wherein the one or more of the same transmission parameters comprise one or more of:
a modulation order;
a resource block, RB, allocation in terms of length and frequency position;
a transmission power level; and
an uplink beam.

AAAAA5. The method of any of embodiments AAAAA1-AAAAA4, wherein the uplink transmissions in each set are restricted to having one or more of the same transmission parameters so that there is phase consistency among the uplink transmissions.

AAAAA6. The method of any of embodiments AAAAA1-AAAAA5, wherein the uplink transmissions in each set are associated with demodulation reference signals, DMRS, in a bundle.

AAAAA7. The method of any of embodiments AAAAA1-AAAAA6, further comprising maintaining relative phase among uplink transmissions in each set, in response to or as a result of the restriction of having one or more of the same transmission parameters.

AA. The method of any of the previous embodiments, further comprising:
providing user data; and
forwarding the user data to a host computer via the transmission to a base station.

Group B Embodiments

B1. A method performed by a radio network node, the method comprising:
transmitting, to a wireless device, signaling that configures the wireless device to determine, based on one or more rules, an uplink transmission timing of an uplink transmission to be performed on a carrier or bandwidth part at or after a nominal start time as part of, or during a window of time spanned by, a set of uplink transmissions that are restricted to having one or more of the same transmission parameters on the carrier or bandwidth part, wherein the one or more rules specify:
the uplink transmission timing of the uplink transmission is to be adjusted according to a timing advance adjustment if one or more first conditions are met; and
the uplink transmission timing of the uplink transmission is not to be adjusted according to the timing advance adjustment if one or more second conditions are met.

B2. The method of embodiment B1, wherein the one or more first conditions include a first condition that is met if the uplink transmission is to be performed during the window of time spanned by the set of uplink transmissions but is not performed as part of the set of uplink transmissions, and wherein the one or more second conditions include a second condition that is met if the uplink transmission is to be performed as part of the set of uplink transmissions.

B3. The method of any of embodiments B1-B2, wherein the window of time spanned by the set of uplink transmissions includes a bundle of time slots, wherein the uplink transmissions in the set are to be performed during respective ones of the time slots in the bundle.

B4. The method of embodiment B3, wherein the one or more first conditions include a first condition that is met if the uplink transmission is to be performed during the window of time spanned by the set of uplink transmissions but not during a time slot in the bundle, and wherein the one or more second conditions include a second condition that is met if the uplink transmission is to be performed during a time slot in the bundle.

B5. The method of any of embodiments B1-B4, wherein the one or more first conditions include a first condition that is met if the uplink transmission is to be performed on a first physical channel of the carrier or bandwidth part, and wherein the one or more second conditions include a second condition that is met if the uplink transmission is to be performed on a second physical channel of the carrier or bandwidth part.

B6. The method of embodiment B5, wherein uplink transmissions performed on the first physical channel are performed as part of the set of uplink transmissions, and wherein uplink transmissions performed on the second physical channel are not performed as part of the set of uplink transmissions.

B7. The method of any of embodiments B9-B10, wherein the signaling indicates the threshold amount.

B8. The method of any of embodiments B1-B7, wherein the one or more first conditions include a first condition that is met if the uplink transmission is to be performed on a first transmit chain of the wireless device, and wherein the one or more second conditions include a second condition that is met if the uplink transmission is to be performed on a second transmit chain of the wireless device.

B9. The method of any of embodiments B1-B8, wherein the one or more first conditions include a first condition that is met if an amount by which the wireless device is to adjust the uplink transmission timing according to the timing advance adjustment is smaller than a threshold amount, and wherein the one or more second conditions include a second condition that is met if the amount by which the wireless device is to adjust the uplink transmission timing according to the timing advance adjustment is larger than the threshold amount.

B10. The method of any of embodiments B1-B8, wherein the one or more first conditions include a first condition that is met if an amount by which the wireless device is to adjust the uplink transmission timing according to the timing advance adjustment is larger than a threshold amount, and wherein the one or more second conditions include a second condition that is met if the amount by which the wireless device is to adjust the uplink transmission timing according to the timing advance adjustment is smaller than the threshold amount.

B11. The method of any of embodiments B1-B10, wherein the one or more first conditions include a first condition that is met if the wireless device is to increase advancement of the uplink transmission timing of uplink transmissions on the carrier or bandwidth, and wherein the one or more second conditions include a second condition that is met if the wireless device is to decrease advancement of the uplink transmission timing of uplink transmissions on the carrier or bandwidth.

B12. The method of any of embodiments B1-B11, wherein the one or more first conditions include a first condition that is met if the timing advance adjustment is obtained by receiving a timing advance command that indicates the timing advance adjustment, and wherein the one or more second conditions include a first condition that is met if the timing advance adjustment is not obtained by receiving a timing advance command that indicates the timing advance adjustment.

B13. The method of any of embodiments B1-B12, wherein the one or more first conditions include a first condition that is met if signaling from a wireless communication network indicates the uplink transmission timing of the uplink transmission is to be adjusted according to the timing advance adjustment, and wherein the one or more second conditions include a second condition that is met if no signaling from the wireless communication network indicates the uplink transmission timing of the uplink transmission is to be adjusted according to the timing advance adjustment.

B14. The method of any of embodiments B1-B13, wherein the set of uplink transmissions includes a set of Physical Uplink Shared Channel, PUSCH, transmissions.

B15. The method of any of embodiments B1-B14, wherein the one or more of the same transmission parameters comprise parameters that impact phase consistency of the uplink transmissions in the set.

B16. The method of any of embodiments B1-B15, wherein the one or more of the same transmission parameters comprise one or more of:

a modulation order;

a resource block, RB, allocation in terms of length and frequency position;

a transmission power level; and an uplink beam.

B17. The method of any of embodiments B1-B16, wherein the set of uplink transmissions are restricted to having one or more of the same transmission parameters so that there is phase consistency among the uplink transmissions.

B18. The method of any of embodiments B1-B17, wherein the uplink transmissions in the set are associated with demodulation reference signals, DMRS, in a bundle.

B19. The method of any of embodiments B1-B18, wherein the nominal start time is a time beginning at which adjustment to an uplink transmission timing of uplink transmissions on the carrier or bandwidth part is to apply.

B20. The method of any of embodiments B1-B19, further comprising transmitting, to the wireless device, a timing advance command that commands to the wireless device to perform an adjustment to an uplink transmission timing of uplink transmissions on the carrier or bandwidth part, wherein the adjustment is to apply beginning at the nominal start time.

B21. The method of embodiment B20, wherein the nominal start time is a beginning of an uplink slot that is a certain number of uplink slots after an uplink slot on which the timing advance command was transmitted.

B22. The method of any of embodiments B1-B21, further comprising performing joint channel estimation across a set of slots within which respective ones of the uplink transmissions in the set are received from the wireless device.

B23. The method of any of embodiments B1-B21, further comprising performing joint channel estimation across a set of demodulation reference signals associated with respective ones of the uplink transmissions.

B34. The method of any of embodiments B1-B23, further comprising:

deciding whether or not to perform joint channel estimation for receiving the set of uplink transmissions, based on whether or not the wireless device is to adjust an uplink transmission timing of an uplink transmission in the set of uplink transmissions; and performing or not performing joint channel estimation for receiving the set of uplink transmissions according to said deciding.

BB1. A method performed by a radio network node, the method comprising:

transmitting a timing advance command that commands a wireless device to perform an adjustment to an uplink transmission timing of uplink transmissions on a carrier or bandwidth part; and transmitting signaling that indicates when the wireless device is to apply the adjustment.

BB2. The method of embodiment BB1, wherein the signaling indicates an earliest time at which the adjustment is to be applied.

BB33. The method of embodiment BB11, wherein the signaling indicates whether the adjustment is to be applied:

at a beginning of an uplink slot that is a certain number of uplink slots after an uplink slot on which the timing advance command was received; or after or at the end of a window of time spanned by a set of uplink transmission that are restricted to having one or more of the same transmission parameters on the carrier or bandwidth part.

BB4. The method of embodiment BB1, wherein the signaling indicates whether or not the wireless device is to respect a threshold that governs or impacts when the wireless device is to apply the adjustment.

BB5. The method of any of embodiments BB1-BB4, wherein the signaling indicates whether the wireless device is to apply the adjustment at the same time or at different times on each carrier within the same timing advance group.

BBB1. A method performed by a radio network node, the method comprising:

transmitting, to a wireless device, signaling that configures sets of uplink transmissions on respective carriers in a timing advance group to span the same window of time, wherein the uplink transmissions in each set is restricted to having one or more of the same transmission parameters.

BBB2. The method of embodiment BBB1, wherein each set of uplink transmissions is a set of Physical Uplink Shared Channel, PUSCH, transmissions.

BBB3. The method of any of embodiments BBB1-BBB2, wherein the one or more of the same transmission parameters comprise parameters that impact phase consistency of the uplink transmissions in a set.

BBB4. The method of any of embodiments BBB1-BBB3, wherein the one or more of the same transmission parameters comprise one or more of:

a modulation order;
a resource block, RB, allocation in terms of length and frequency position;
a transmission power level; and
an uplink beam.

BBB5. The method of any of embodiments BBB1-BBB4, wherein the uplink transmissions in each set are restricted to having one or more of the same transmission parameters so that there is phase consistency among the uplink transmissions.

BBB6. The method of any of embodiments BBB1-BBB5, wherein the uplink transmissions in each set are associated with demodulation reference signals, DMRS, in a bundle.

BBBB1. A method performed by a radio network node, the method comprising:
performing a downlink data channel transmission that carries a timing advance command which commands a wireless device to perform an adjustment to an uplink transmission timing of uplink transmissions on a carrier or bandwidth part;
monitoring for an acknowledgement of the downlink data channel transmission; and
deciding whether or not to perform joint channel estimation for receiving a set of uplink transmissions on the carrier or bandwidth part, based on whether or not the an acknowledgement of the downlink data channel transmission is received according to said monitoring; and
performing or not performing joint channel estimation for receiving the set of uplink transmissions according to said deciding.

BB. The method of any of the previous embodiments, further comprising:
obtaining user data; and
forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:
communication circuitry; and
processing circuitry configured to perform any of the steps of any of the Group A embodiments.

C4. A wireless device comprising:
processing circuitry configured to perform any of the steps of any of the Group A embodiments; and
power supply circuitry configured to supply power to the wireless device.

C5. A wireless device comprising:
processing circuitry and memory, the memory containing instructions executable by the processing circuitry whereby the wireless device is configured to perform any of the steps of any of the Group A embodiments.

C6. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B embodiments.

C10. A radio network node comprising processing circuitry configured to perform any of the steps of any of the Group B embodiments.

C11. A radio network node comprising:
communication circuitry; and
processing circuitry configured to perform any of the steps of any of the Group B embodiments.

C12. A radio network node comprising:
processing circuitry configured to perform any of the steps of any of the Group B embodiments;
power supply circuitry configured to supply power to the radio network node.

C13. A radio network node comprising:
processing circuitry and memory, the memory containing instructions executable by the processing circuitry whereby the radio network node is configured to perform any of the steps of any of the Group B embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
- the processing circuitry of the host computer is configured to execute a host application;
- the UE is configured to execute a client application associated with the host application, thereby providing the user data to be received by the host computer.

D27. A method implemented in a communication system including a host computer, a base station and a user equipment (UE), the method comprising:
- at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
6G 6th Generation
ABS Almost Blank Subframe
ARQ Automatic Repeat Request
AWGN Additive White Gaussian Noise
BCCH Broadcast Control Channel
BCH Broadcast Channel
BS Base station
BWP Bandwidth part
CA Carrier Aggregation
CC Carrier Component
CCCH SDU Common Control Channel SDU
CDMA Code Division Multiplexing Access
CGI Cell Global Identifier
CIRChannel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DM-RS, DMRS Demodulation reference signal
DRX Discontinuous Reception
DTX Discontinuous Transmission
DTCH Dedicated Traffic Channel
DUT Device Under Test
E-CID Enhanced Cell-ID (positioning method)
eMBMS evolved Multimedia Broadcast Multicast Services
E-SMLC Evolved-Serving Mobile Location Centre
ECGI Evolved CGI
eNB E-UTRAN NodeB
ePDCCH Enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
gNB Base station in NR
GNSS Global Navigation Satellite System
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MAC Message Authentication Code
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
Rx Receiver, receive
RSTD Reference Signal Time Difference
SCH Synchronization Channel
SCell Secondary Cell
SCS Subcarrier spacing
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TA Timing advance
TAG Timing advance group
TDD Time Division Duplex
TDOA Time Difference of Arrival
TOA Time of Arrival
TSS Tertiary Synchronization Signal
TTI Transmission Time Interval
Tx Transmitter, transmit
UE User Equipment
UL Uplink
USIM Universal Subscriber Identity Module
UTDOA Uplink Time Difference of Arrival
WCDMA Wide CDMA
WLAN Wide Local Area Network

The invention claimed is:

1. A method performed by a wireless device, the method comprising:

obtaining a window of time for bundling of a set of uplink transmissions on a bandwidth part, wherein the bundling is for keeping power consistency and phase continuity, wherein the bundling is demodulation reference signal (DMRS) bundling;

determining whether or not to apply a timing advance adjustment within the window of time, wherein the timing advance adjustment comprises an adjustment to a transmission timing of an uplink transmission in the set of uplink transmissions, wherein said determining comprises:

determining to apply the timing advance adjustment within the window of time if the timing advance adjustment is indicated by a received timing advance command; and determining to not apply the timing advance adjustment within the window of time if the timing advance adjustment is due to a detected error in downlink timing; and transmitting the uplink transmission on the bandwidth part during the window of time using a transmission timing which is in accordance with said determining.

2. The method of claim 1, wherein the determining to not apply the timing advance adjustment within the window of time maintains phase consistency among uplink transmissions in the window.

3. The method of claim 1, wherein the determining to apply the timing advance adjustment within the window of time causes phase consistency among uplink transmissions in the window of time not to be maintained.

4. The method of claim 1, wherein the window of time is obtained based on a configuration received from a radio network node.

5. The method of claim 1, wherein the window of time includes a bundle of time slots, wherein the uplink transmissions are to be performed during respective ones of the time slots in the bundle.

6. The method of claim 1, wherein the set of uplink transmissions includes a set of Physical Uplink Shared Channel (PUSCH) transmissions.

7. The method of claim 1, wherein the wireless device is independently configurable whether to apply DMRS bundling for a Physical Uplink Control Channel (PUCCH) and whether to apply DMRS bundling for a Physical Uplink Shared Channel (PUSCH).

8. A non-transitory computer-readable storage medium on which is stored a computer program comprising instructions which, when executed by at least one processor of a wireless device, causes the wireless device to carry out the method of claim 1.

9. The method of claim 1, wherein determining to not apply the timing advance adjustment within the window of time if the timing advance adjustment is due to a detected error in downlink timing comprises determining to defer the timing advance adjustment until after the window of time.

10. The method of claim 1, wherein said determining comprises determining to not apply the timing advance adjustment within the window of time if the timing advance adjustment is due to an error in downlink timing that the wireless device detected from measurements of downlink signals.

11. A wireless device comprising processing circuitry and memory, the memory containing instructions executable by the processing circuitry whereby the wireless device is configured to:

obtain a window of time for bundling for a set of uplink transmissions on a bandwidth part, wherein the bundling is for keeping power consistency and phase continuity, wherein the bundling is demodulation reference signal (DMRS) bundling;

make a determination of whether or not to apply a timing advance adjustment within the window of time, wherein the timing advance adjustment comprises an adjustment to a transmission timing of an uplink transmission in the set of uplink transmissions, wherein the determination is:

a determination to apply the timing advance adjustment within the window of time if the timing advance adjustment is indicated by a received timing advance command; and a determination to not apply the timing advance adjustment within the window of time if the timing advance adjustment is due to a detected error in downlink timing; and transmit the uplink transmission on the bandwidth part during the window of time using a transmission timing which is in accordance with the determination.

12. The wireless device of claim 11, wherein a determination to not apply the timing advance adjustment within the window of time maintains phase consistency among uplink transmissions in the window.

13. The wireless device of claim 11, wherein a determination to apply the timing advance adjustment within the window of time causes phase consistency among uplink transmissions in the window of time not to be maintained.

14. The wireless device of claim 11, wherein the window of time is obtained based on a configuration received from a radio network node.

15. The wireless device of claim 11, wherein the window of time includes a bundle of time slots, wherein the uplink transmissions are to be performed during respective ones of the time slots in the bundle.

16. The wireless device of claim 11, wherein the set of uplink transmissions includes a set of Physical Uplink Shared Channel (PUSCH) transmissions.

17. The wireless device of claim 11, wherein the wireless device is independently configurable whether to apply DMRS bundling for a Physical Uplink Control Channel (PUCCH) and whether to apply DMRS bundling for a Physical Uplink Shared Channel (PUSCH).

18. The wireless device of claim 11, wherein the determination is a determination to defer the timing advance adjustment until after the window of time if the timing advance adjustment is due to a detected error in downlink timing.

19. The wireless device of claim 11, wherein the determination is a determination to not apply the timing advance adjustment within the window of time if the timing advance adjustment is due to an error in downlink timing that the wireless device detected from measurements of downlink signals.

* * * * *